(12) United States Patent
Bose et al.

(10) Patent No.: US 12,524,548 B2
(45) Date of Patent: Jan. 13, 2026

(54) ROLLBACK OF PROCESSOR MICROCODE UPDATES IN RUNTIME WITHOUT SYSTEM REBOOT

(71) Applicant: Intel Corporation, Santa Clara, CA (US)

(72) Inventors: Pratim Bose, Kolkata (IN); Karunakara Kotary, Portland, OR (US); Kausik Ghosh, Bangalore (IN); Arun Hodigere, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 17/695,817

(22) Filed: Mar. 15, 2022

(65) Prior Publication Data
US 2023/0297680 A1   Sep. 21, 2023

(51) Int. Cl.
*G06F 21/57* (2013.01)

(52) U.S. Cl.
CPC ...... *G06F 21/572* (2013.01); *G06F 2221/033* (2013.01)

(58) Field of Classification Search
CPC .......................... G06F 21/572; G06F 2221/033
See application file for complete search history.

(56) References Cited

U.S. PATENT DOCUMENTS

| | | | |
|---|---|---|---|
| 11,281,453 B1* | 3/2022 | Ramachandran | G06F 8/65 |
| 11,507,394 B1* | 11/2022 | Pyla | G06F 13/4221 |
| 2007/0088939 A1* | 4/2007 | Baumberger | G06F 9/24 |
| | | | 712/248 |
| 2013/0097655 A1* | 4/2013 | Vaidyanathan | G06F 21/55 |
| | | | 726/1 |

(Continued)

FOREIGN PATENT DOCUMENTS

EP   3674890 A1 *   7/2020   ........... G06F 1/3203

OTHER PUBLICATIONS

Komano, Yuichi, et al. "Efficient and secure firmware update/rollback method for vehicular devices." Information Security Practice and Experience: 14th International Conference, ISPEC 2018, Tokyo, Japan, Sep. 25-27, 2018, Proceedings 14. Springer International Publishing, 2018. (Year: 2018).*

(Continued)

*Primary Examiner* — Michael Simitoski
(74) *Attorney, Agent, or Firm* — Nicholson De Vos Webster & Elliott LLP

(57) ABSTRACT

Techniques for updates and rollbacks of firmware patches in a computing system during runtime are provided. A processor includes one or more intellectual property (IP) blocks; a secure patch memory to store a first firmware patch in a primary patch region and a second firmware patch in a secondary patch region; a processing core to execute a first patch commit instruction; and a security controller to send the second firmware patch to the one or more IP blocks, set the secondary patch region to the primary patch region when the first patch commit instruction indicates the second firmware patch is valid, and get the first firmware patch from the primary patch region and send the first firmware patch to the one or more IP blocks when the first patch commit instruction indicates the second firmware patch is invalid.

24 Claims, 23 Drawing Sheets

(56) References Cited

U.S. PATENT DOCUMENTS

| | | | | |
|---|---|---|---|---|
| 2014/0040605 | A1* | 2/2014 | Futral | G06F 9/445 |
| | | | | 713/2 |
| 2015/0019800 | A1* | 1/2015 | Ramirez | G06F 11/1433 |
| | | | | 711/103 |
| 2017/0046152 | A1* | 2/2017 | Shih | G06F 11/0727 |
| 2017/0308502 | A1* | 10/2017 | Hindle | G06F 15/7821 |
| 2018/0307479 | A1* | 10/2018 | Subramanian | G06F 8/658 |
| 2019/0004788 | A1* | 1/2019 | Juliato | G06F 8/658 |
| 2019/0042230 | A1* | 2/2019 | Dewan | G06F 21/57 |
| 2019/0073478 | A1* | 3/2019 | Khessib | G06F 13/4282 |
| 2020/0226260 | A1* | 7/2020 | Aggarwal | G06F 21/566 |
| 2020/0226261 | A1* | 7/2020 | Dewan | G06F 21/572 |
| 2020/0257521 | A1* | 8/2020 | Jayakumar | G06F 21/572 |
| 2020/0356357 | A1* | 11/2020 | Narasimhan | G06F 15/167 |
| 2020/0372157 | A1* | 11/2020 | Singer | G06F 11/0793 |
| 2021/0303691 | A1* | 9/2021 | Dewan | G06F 21/572 |
| 2021/0357202 | A1* | 11/2021 | Swirydczuk | G06F 8/654 |
| 2022/0137955 | A1* | 5/2022 | Aggarwal | G06F 11/3688 |
| | | | | 717/168 |

OTHER PUBLICATIONS

Ray, Sandip, Abhishek Basak, and Swarup Bhunia. "Security Policy in System-on-Chip Designs.", 2019. (Year: 2019).*
Intel Corporation, "Firmware Interface Table. BIOS Specification," Apr. 2020, 17 pages, Revision 1.2, Document 599500.

* cited by examiner

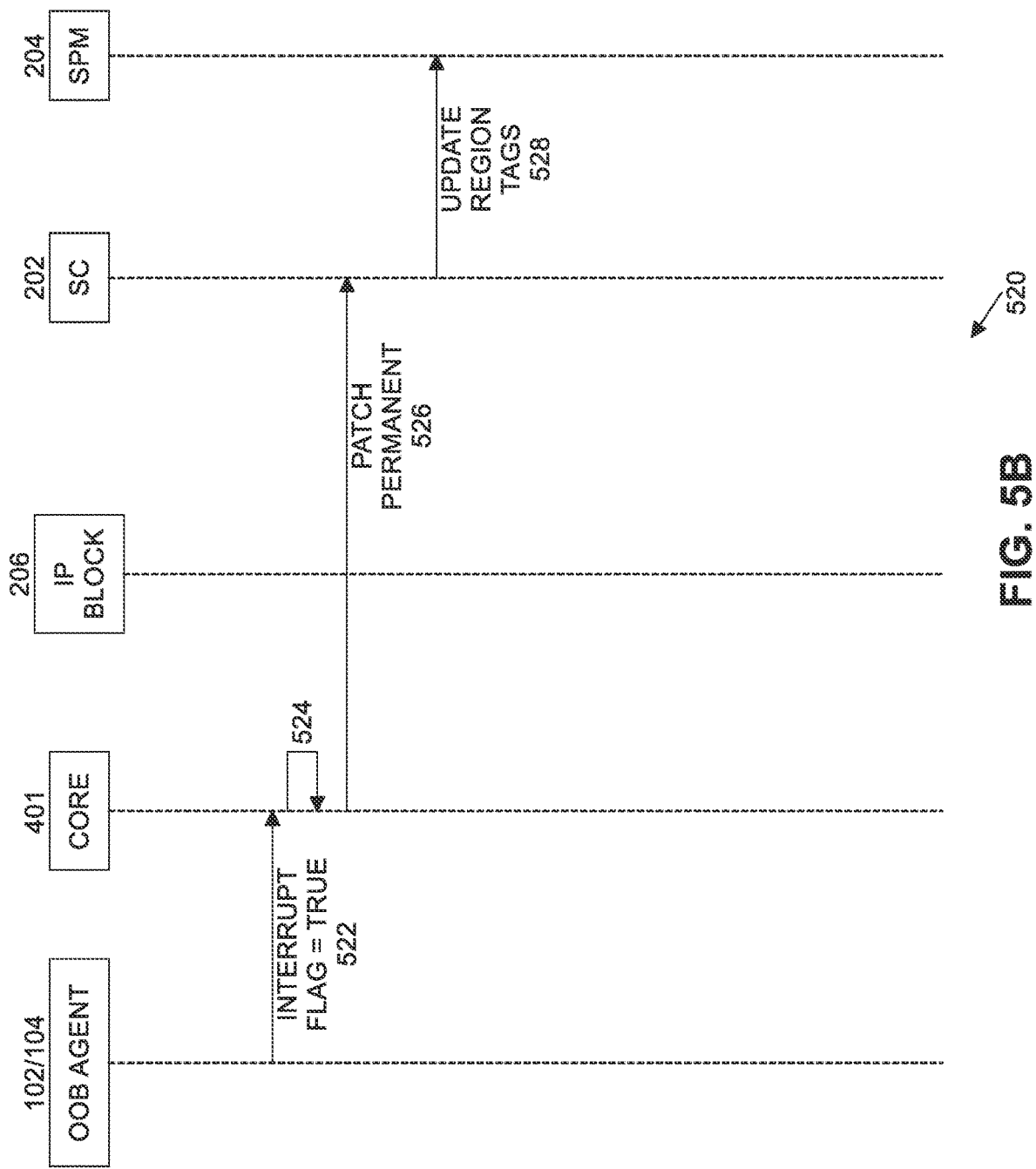

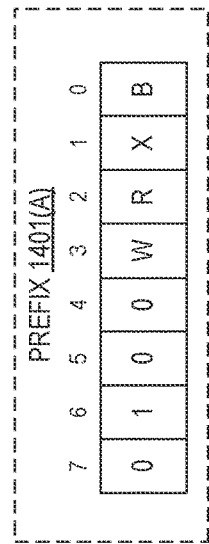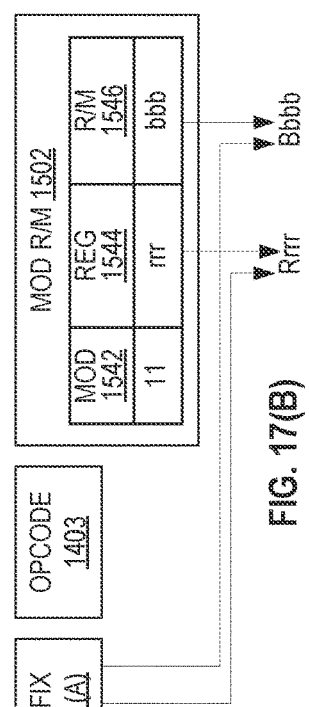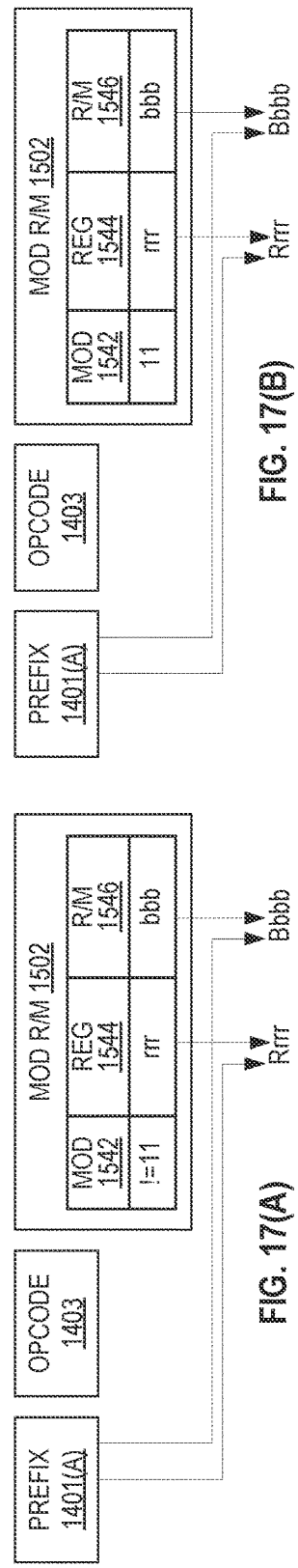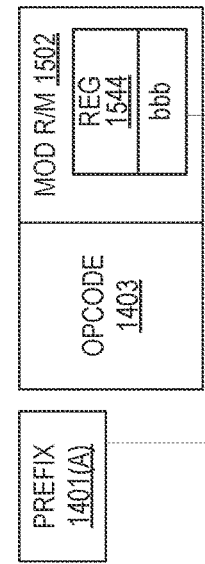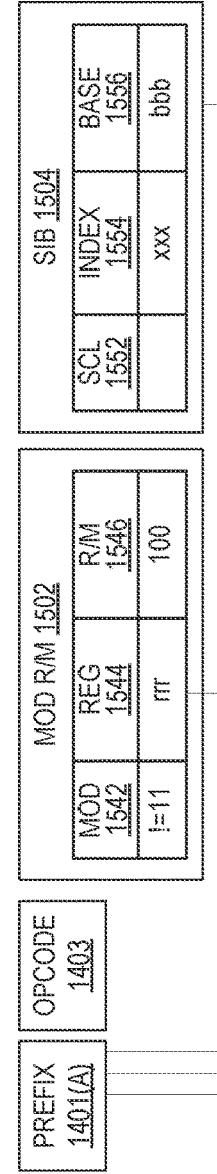

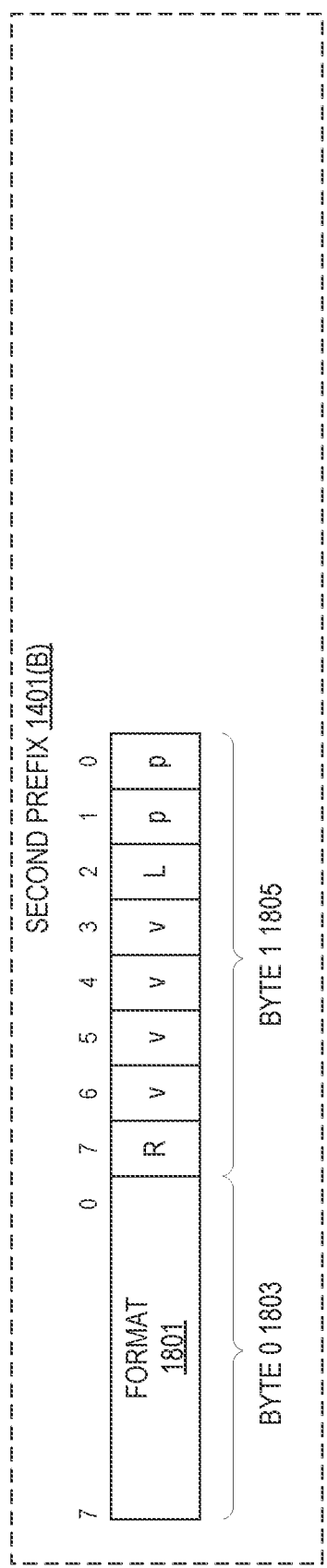
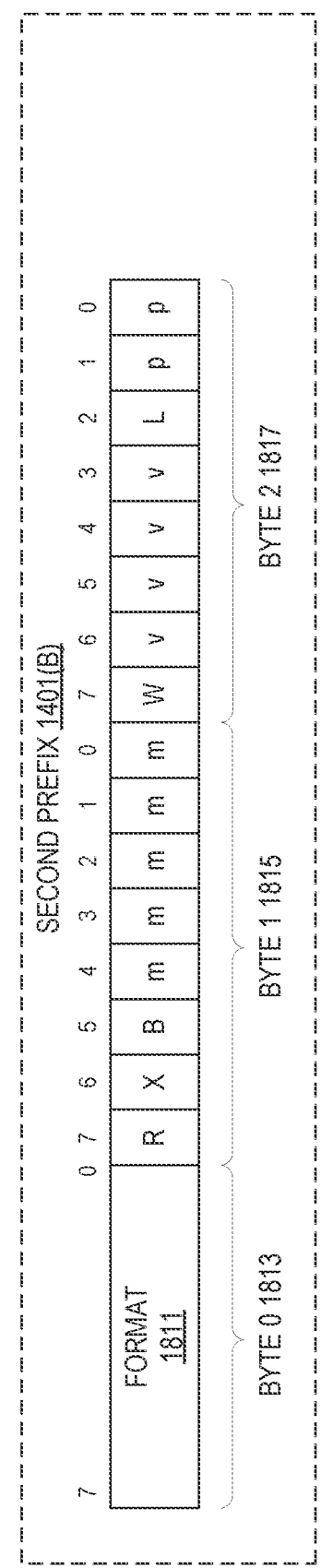

ROLLBACK OF PROCESSOR MICROCODE UPDATES IN RUNTIME WITHOUT SYSTEM REBOOT

BACKGROUND

The technology described herein generally relate to updating microcode in processors of computing systems. In particular, the disclosure relates to rollback of updated microcode for processors in runtime without a reboot of the computing system.

Processors typically include microcode related to a central processing unit (CPU), one or more intellectual property (IP) blocks, and/or a system on a chip (SoC). Microcode can be loaded at various times, including early CPU reset or firmware interface table (FIT) microcode updates, early and late basic input/output (I/O) system (BIOS) microcode updates, and early and runtime operating system (OS) microcode updates. Sometimes the microcode updates are invalid or deficient and must be rolled back to a previous version.

BRIEF DESCRIPTION OF DRAWINGS

Various examples in accordance with the present disclosure will be described with reference to the drawings.

FIG. 5A-C illustrates patch rollback operations for an out of band agent according to one implementation.

FIG. 16 illustrates examples of a first prefix.

FIGS. 17(A)-(D) illustrate examples of how the R, X, and B fields of the first prefix 1401(A) are used.

FIGS. 18(A)-(B) illustrate examples of a second prefix.

DETAILED DESCRIPTION

Figure 1:
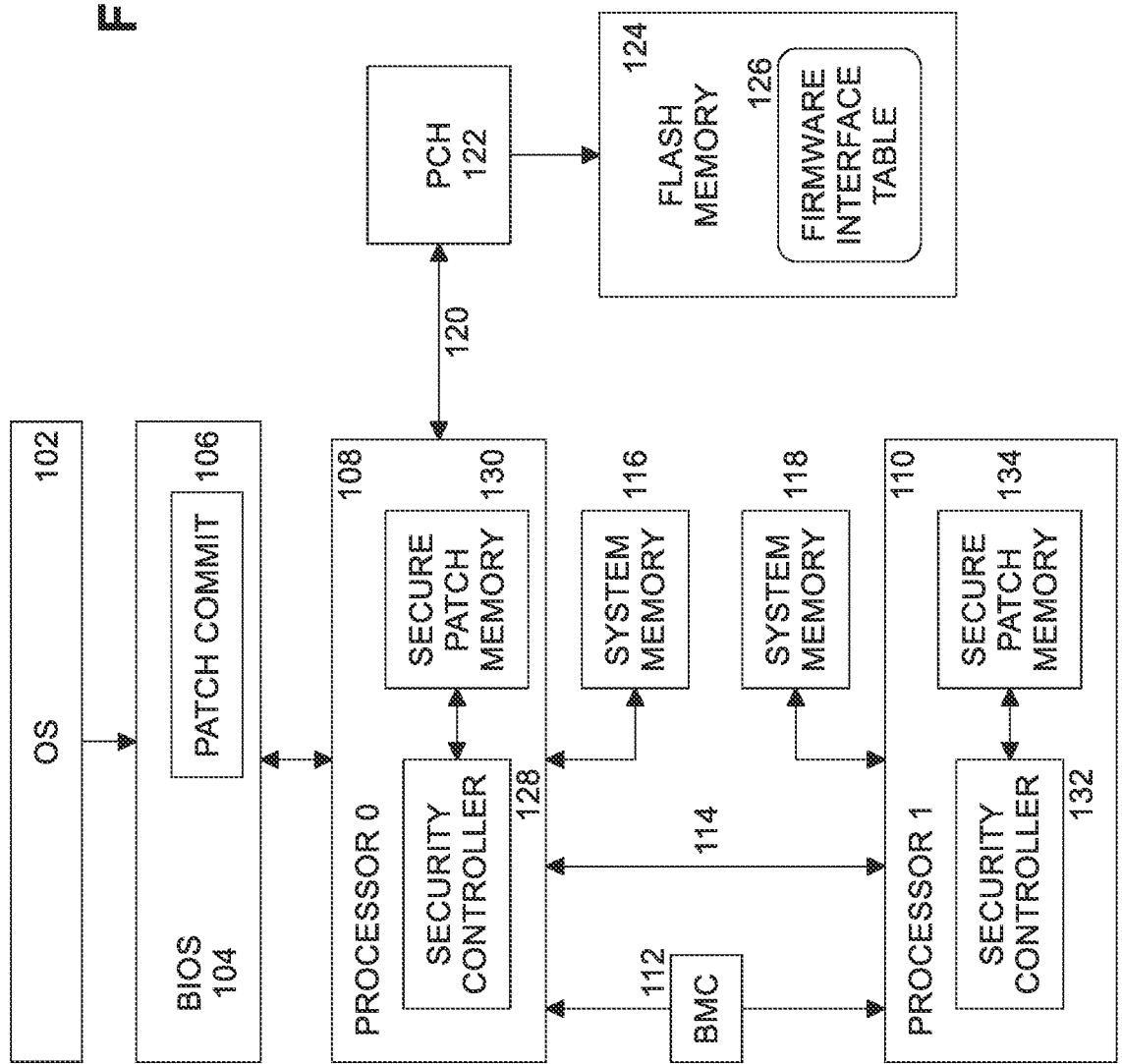
FIG. 1 illustrates an example computing system according to one implementation.

The present disclosure relates to methods, apparatus, systems, and non-transitory computer-readable storage media for a computing system to include an on-die security controller that interfaces to an on-die secure patch memory for storage of firmware patches. The secure patch memory is partitioned into one or more second regions (e.g., one or more secondary regions) to store at least one new patch and one or more first regions (e.g., one or more primary regions) to store at least one latest "good" working patch. A new Patch Commit CPU instruction is defined that sequences the security controller to get a patch from the second region of the secure patch memory and send the patch to one or more individual IP blocks in an SoC. Setting of an additional argument to the Patch Commit instruction causes the security controller to get the last known "good" working patch (e.g., the previous patch) from the first region of the secure patch memory and apply the previous patch to the individual IP blocks to restore the original functionality during runtime (thereby completing a rollback of an invalid update during runtime and without a system reboot).

In the following description, numerous specific details are set forth. However, embodiments may be practiced without these specific details. In other instances, well-known circuits, structures and techniques have not been shown in detail to avoid obscuring the understanding of the description.

CPU microcode is typically loaded on a per-IP block basis from the system firmware flash memory or memory. However, the number of IP blocks inside a server SoC with on-die micro controllers is growing exponentially. The latest generation of some CPUs have five or more unique IP blocks that may need to be patched over time. Server SoCs are growing in size and complexity and there is a business need for regular patch updates to deploy critical security fixes and power/performance updates. Data center servers must meet strict uptime requirements. For example, some servers are not expected to be rebooted for a whole year. It is not feasible to reflash the system firmware image and reboot the servers to deploy new microcode patch updates as this does not meet requirements of data center uptime service level agreements (SLAs).

To solve this problem, many current computing architectures allow the OS to update patches during runtime without rebooting the computing system. One problem with an OS runtime patch update occurs when the update does not meet the desired expectations. For example, it's possible that on certain computing systems the patch update may cause a degradation in system performance (e.g., due to a Spectre/Meltdown vulnerability). The customer operating the data center server would then like to revert/roll back the patch back to the last known "good" working version but many times this is not possible. For example, older working patch versions may be lost or overwritten in a sequence of patch updates since the last valid uptime of the computing system. Additionally, an IP block may not cleanly support a patch downgrade without performing a system reboot. Further, OS runtime patch rollback requires unwind routines for every IP block patch. The entire SoC IP patching process is orchestrated by one of the processing core microcode updates.

In these cases, the customer is forced to reboot the computing system and manually patch the computing system again back to the last known working patch. This is very cumbersome when operating large data centers having thousands or tens of thousands of CPUs across several processor generations and large numbers of IP blocks.

FIG. 1 illustrates an example computing system 100 according to one implementation. Computing system 100 may be implemented as one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to perform cryptographic enforcement of borrow checking.

In general, computing system 100 may include processing cores, caches, registers, translation lookaside buffers (TLBs), memory management units (MMUs), other processor hardware, input/output (I/O) devices, main memory, secondary memory, other system-level hardware, IP blocks and other hardware found in processors and computer systems (e.g., as shown in the exemplary other processors and computer systems disclosed below).

In particular, computing system 100 includes an OS 102 and a BIOS 104. As described in further detail herein, BIOS 104 calls a new Patch Commit instruction 106 to manage the sending and committing of firmware patches to one or more IP blocks in computing system 100. Computing system 100 includes a plurality of processors, such as processor 0 108 and processor 1 110, coupled via coherent link 114 and each of the plurality of processors coupled to a system memory, respectively, such as system memory 116 and system memory 118. Each processor includes on-die security controller circuitry to securely manage the firmware patch update process as described below. For example, processor 0 108 includes security controller 128 and processor 1 110 includes security controller 132. Further, each processor includes an on-die secure patch memory to store firmware patches that are accessible only by the security controller. Thus, in this example computing system, processor 0 108 includes on-die secure patch memory 130 accessed by on-die security controller 128 and processor 1 110 includes on-die secure patch memory 134 accessed by on-die security controller 132. That is, the security controller and the secure patch memory are on the same die as processing cores of a processor. Although only two processors, system memories, security controllers, and secure patch memories are shown in FIG. 1, there may be any number of these components in any given computing system.

Baseboard management controller (BMC) 112 is a processor used, at least in part, for remote managing and monitoring of computing system 100. Platform control hub (PCH) 122 is coupled to at least one of the processors, such as processor 0 108 over, for example, a direct media interface (DMI) link 120. PCH 122 is coupled with flash memory 124, which stores firmware interface table (FIT) 126. Each entry of the FIT defines a starting address and attributes of components of the BIOS 104. The FIT is generated at build time, based on the size and location of firmware components, and is used to boot computing system 100.

Thus, the computing system architecture described in FIG. 1 includes an on-die security controller 128, 132 in the CPU package which securely controls patching firmware in system components such as IP blocks. The security controller 128, 132 has access to on-die secure patch memory 130, 134 configured through protected range registers to be used as a storage for patch firmware. The secure patch memory 130, 134 may be either non-volatile random-access memory (NVRAM) or dynamic random-access memory (DRAM) mapped into memory space and is accessible only to the associated security controller 128, 132, respectively. The secure patch memory has both first and second region of equal size to store the patch contents and first and second regions for the patch save state. In addition, Patch Commit instruction 106 is provided for applying or reverting these patches.

When the OS 102 initiates the patching flow, the new patch is pulled from system memory 116 by the security controller 128 and stored in a secure second patch region in on-die secure patch memory 130. The security controller may decrypt the patch and check the validity and the data structure of the patch. Once the security controller has validated the patch, the security controller 128 then coordinates with one or more IP blocks (not shown in FIG. 1) in the SoC/computing system 100 and delivers the patch update to the individual IP blocks. The security controller is aware of the overall patch data structure and sends the individual IP block-specific patch to the respective IP blocks. Each of the IP blocks start operating from the new patch. Individual patches running on IP blocks use the save state region to store a list of IP registers with their current register values and values as modified by implementation of the patches.

In one implementation, each IP block runs different firmware and hence needs a different patch. In an implementation, a single firmware patch for computing system 100 combines a plurality of patches for the IP blocks into a single binary image. The security controller inside the CPU is aware of the structure of the single binary image, including the layout of the single binary image and where each individual IP block's firmware patch resides in the single binary image. The security controller extracts individual IP block firmware patches (e.g., individual binary images for selected IP blocks) from this single binary image and delivers the patches to selected IP blocks as needed during the patching operation.

After the patch is committed to the IP blocks, if a patch is needed to be rolled back to a last known "good" working patch, the OS 102 can issue a Patch Commit instruction with a revert/rollback indicator to the security controller 128. The security controller 128 then gets the older, previous patch from a first patch region of the secure patch memory 130 and sends this patch to the individual IP blocks in the SoC/computing system 100. This process adheres to all patch unwind and subversion (SVN) semantics that are currently in use today. The older known "good" working patch in the first patch region can either be from the FIT 126 (BIOS loaded) or could have been an OS loaded patch from the past. When the new patch is working correctly and needs to be retained, the OS 102 makes this patch permanent by reusing the Patch Commit 106 instruction with the appropriate parameter.

The technology described herein includes a first save state region and a second save state region for each patch to store the IP state registers being modified by the patches. Thus, when a patch needs to be rolled back, the patch can restore these registers from the appropriate save state region within secure patch memory 130.

Therefore, the technology described herein provides for runtime seamless patch rollback with no OS reboots. This technology reduces customer downtime for IP block microcode updates and provides for hardware maintenance of patching new and older patches benefitting customer logistics and creating save state regions to allow for easier rollbacks of firmware patches to a known good state.

Figure 2:
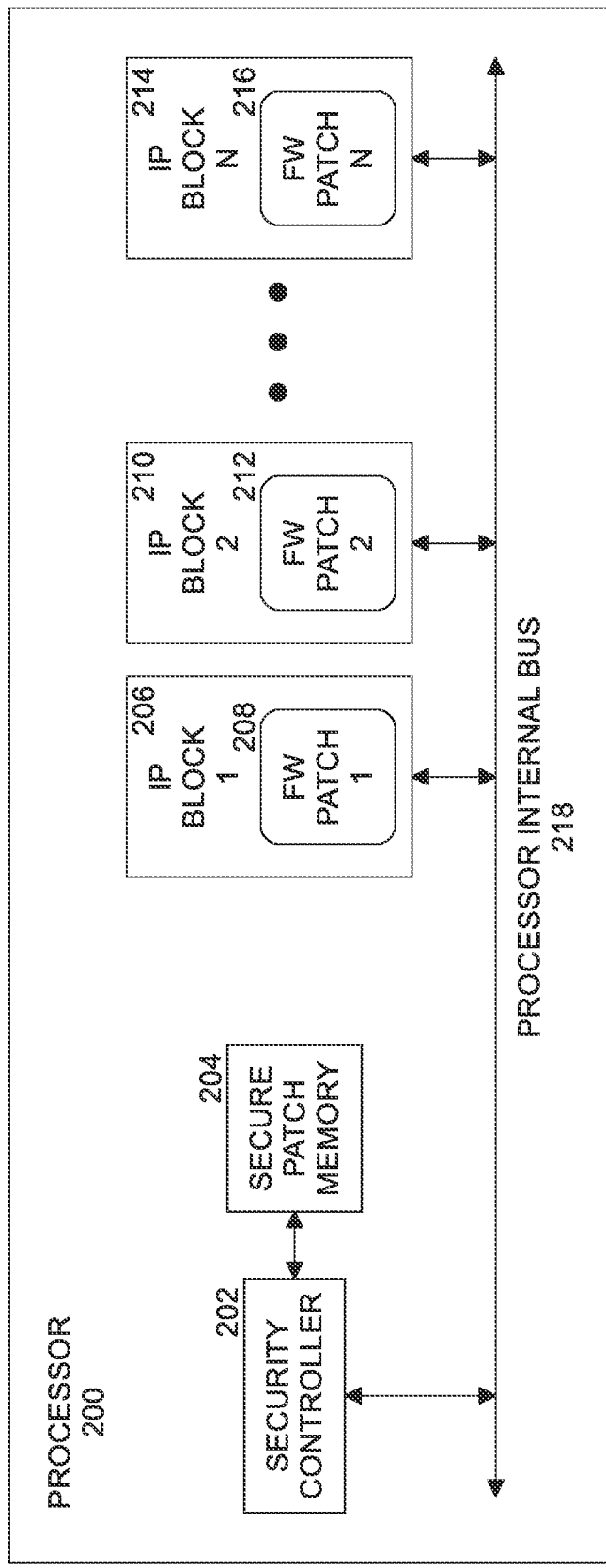
FIG. 2 illustrates an example processor arrangement having one or more intellectual property (IP) blocks according to one implementation.

FIG. 2 illustrates an example processor 200 arrangement having one or more intellectual property (IP) blocks according to one implementation. Processor 200 is an example of processor 0 108 and processor 1 110 of FIG. 1. Security controller 202 is an example of security controller 128 and 132. Secure patch memory 204 is an example of secure patch memory 130 and 134. Security controller 202 stores firmware patches in secure patch memory 204. Security controller interfaces with one or more IP blocks such as IP block 1 206, IP block 2 210, . . . IP block N 214 (where N is a natural number) over processor internal bus 218. Each IP block stores a firmware (FW) image, which may be overwritten with a patch, as needed. For example, IP block 1 206 may include FW patch 1 208, IP block 2 210 may include FW patch 2 212, . . . IP block N 214 may include FW patch N 216. However, any one or more IP blocks may include the same patch, as needed. Each IP block operates according to the firmware loaded within the IP block, including any patch.

Figure 3:
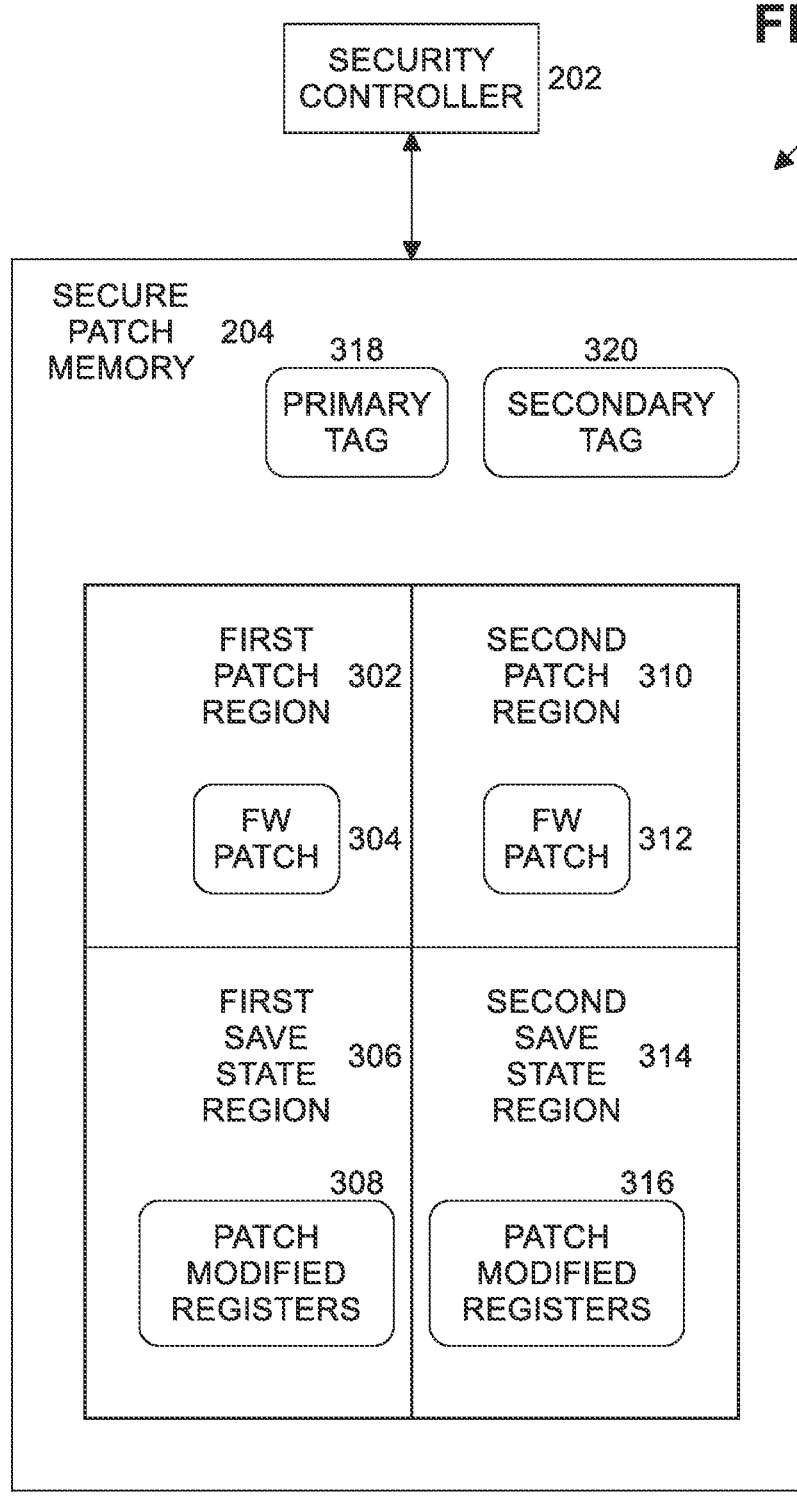
FIG. 3 illustrates an example secure patch memory according to one implementation.

FIG. 3 illustrates an example secure patch memory 204 according to one implementation. Secure patch memory 204 comprises on-die memory that is mapped into the processor memory space and accessed only by security controller 202 according to one or more range registers of processor 200 that allow access to this memory only from the security controller 202. Secure patch memory 204 includes a first patch region 302 to store a last known "good" working patch, shown as FW patch 304, and a first save state region 306 to store patch modified registers 308 associated with implementing FW patch 304. Secure patch memory 204 also includes a second patch region 310 to store a new patch, shown as FW patch 312, and a second save state region 314 to store patch modified registers 316 associated with implementing FW patch 312. Secure patch memory 204 includes a primary tag 318 pointing to the patch region storing the last known "good" working patch and a secondary tag 320 pointing to patch region temporarily storing a new patch undergoing evaluation.

If the new patch update is successful and works as expected, one of OS 102, BIOS 104, or BMC 112 can instruct the security controller to designate the new patch as the latest working "good" patch ('patch permanent'); in which case, the security controller sets the primary tag 318 to point to the second patch region 310 as the primary (swap the regions). The newly assigned primary will now contain the latest 'good' working patch. If the new patch update is unsuccessful or does not work as desired, one of OS 102, BIOS 104, or BMC 112 can instruct the security controller to revert/rollback the patch ('patch rollback'); in this case, the security controller leaves the primary tag 318 pointing to the first patch region 302 and re-downloads the last known working patch from the first patch region to the one or more IP blocks. The patch region pointed to by primary tag 318 always contains the last known working patch irrespective of how many patch updates have been performed.

The size of each patch region is sufficient to store all FW patches. Each individual patch for an IP block is stored at a predetermined fixed offset location in the patch region. In an implementation, the layout of the patch remains the same as existing patch designs. The save state regions store a current state and a modified state of any registers affected by implementing the patch. When a rollback is done, these register values may be used to reset the registers to their original states (prior to an update) to allow the rollback of the patch to work correctly.

Although a monolithic FW patches 304, 312 are shown in FIG. 3, it should be understood that these components may include a plurality of constituent FW patches, with any given constituent FW patch being specific for a selected one or more IP blocks. All actions described herein regarding a FW patch may be expanded to operate on a plurality of constituent patches within the FW patch. For example, FW patch 304 or 312 may include N patches, one of the N patches for each of the N IP blocks, where N is a natural number.

Figure 4A:
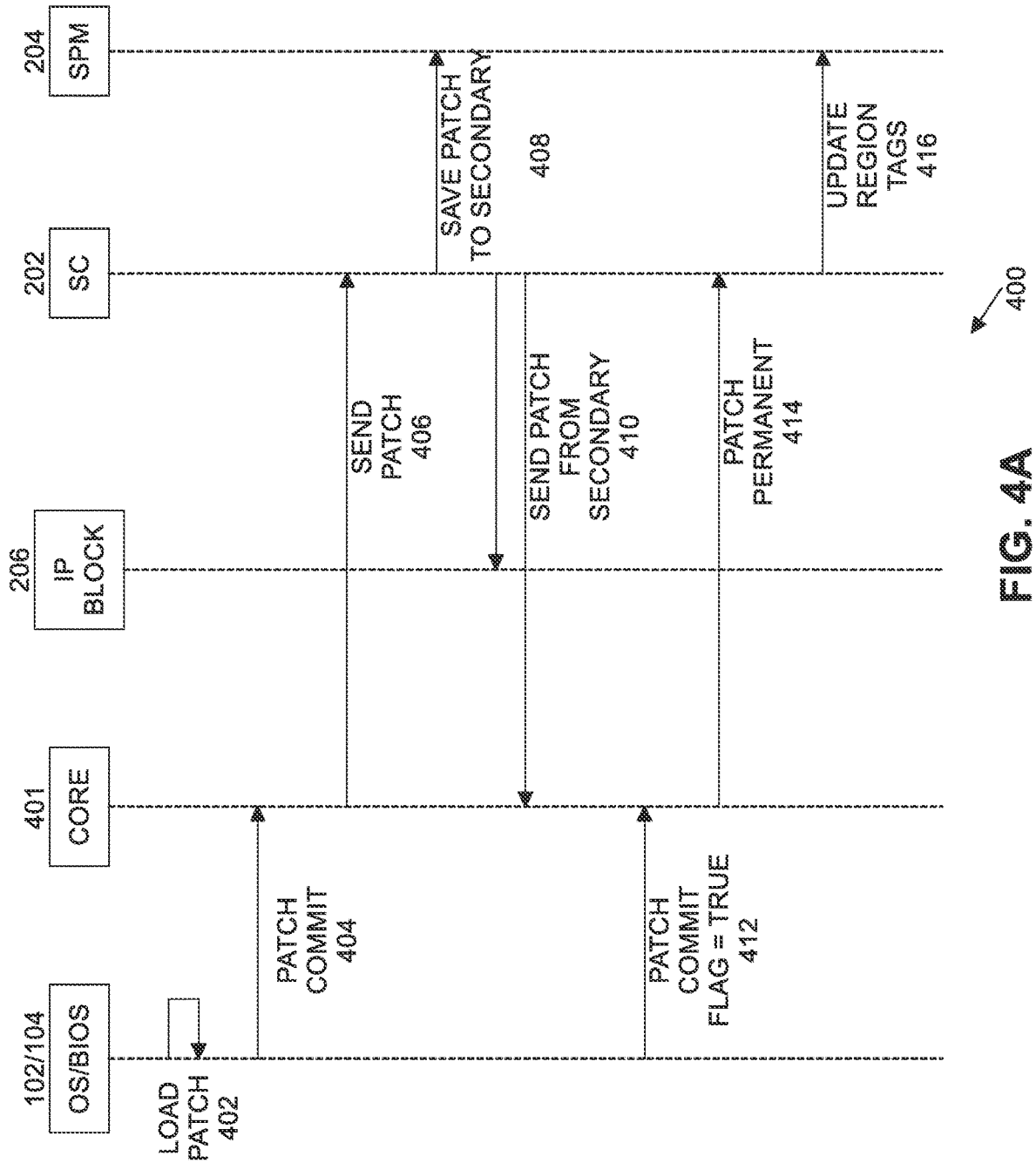
FIG. 4A-B illustrates patch rollback operations according to one implementation.
Figure 4B:
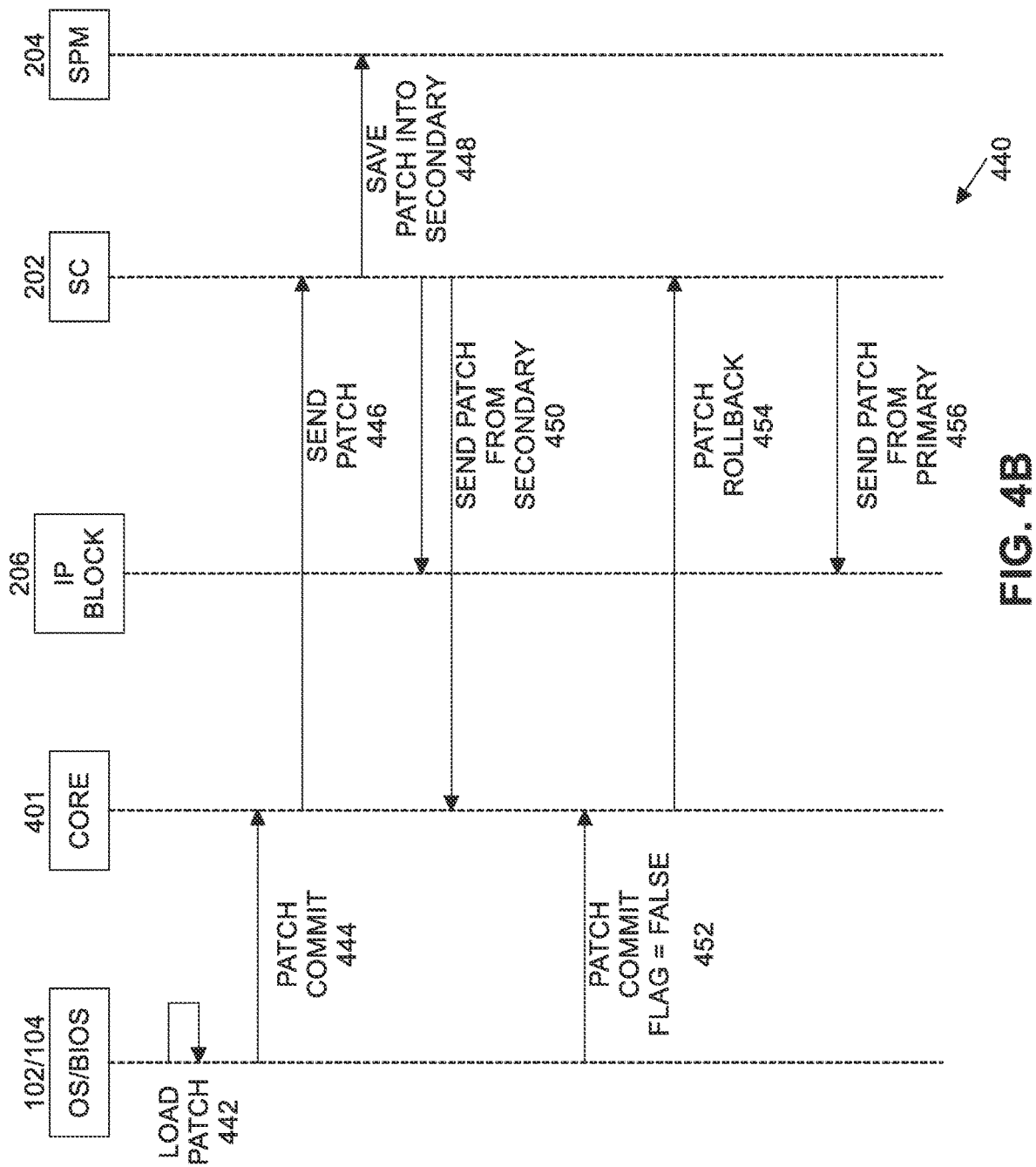

FIG. 4A-B illustrates patch rollback operations 400 according to one implementation. At action 402 of FIG. 4A, either OS 102 or BIOS 104 (depending on the implementation) loads a patch into system memory. Actions 402 through 410 may be performed the first time a patch is loaded by the OS or the BIOS after booting of computing system 100. In one implementation, the patch is retrieved from a memory or storage accessible to processor 200. At action 404, OS 102 or BIOS 104 sends a Patch Commit instruction to a core 401 of processor 200. In one implementation, the Patch Commit instruction is implemented by setting a system address pointer in register EAX and Binary flag in EBX in a Patch Commit model specific register (MSR). At Action 404, the Patch Commit has the EAX=address and the EBX=0 (patch send).

Core 401 sends the patch (as referenced by an address in system memory where the patch is stored) to security controller 202 at action 406. At action 406, the security controller copies the patch from system memory (pointed to by Send patch in action 406) to the patch region pointed to be the secondary tag.

Security controller 202 saves the patch to a patch region of secure patch memory 204 pointed to by secondary tag 320 at action 408 (since primary tag 318 points to the patch region storing the last known "good" patch). Security controller 202 then downloads the patch from the patch region pointed to by the secondary tag to one or more individual IP blocks 206 and/or core(s) 401 at action 410. At action 410, the security controller decrypts the patch stored in the patch region pointed to by the secondary tag and downloads individual core and IP FW patches to their respective blocks.

If the patch is valid and/or acceptable (as determined by OS 102 or BIOS 104), the patch may be committed. At action 412, OS 102 or BIOS 104 sends another Patch Commit instruction, this time with an operation indicating a commit flag set to true, to core 401. In one implementation, at action 412, the Patch Commit has the EAX=0 and the EBX=1 (patch permanent). Core 401 sends a "patch permanent" command to security controller 202 at action 414 to instruct the security controller that the patch should be continued to be used in computing system 100. At action 416, security controller 202 updates the region tags 318, 320. In one implementation, security controller 202 updates the secondary tag 320 to point to the patch region pointed to by the primary tag 318 and then updates the primary tag 318 to point to the patch region storing the newly committed patch. This flips the primary/secondary designations of the two patch regions. The patch stored in the patch region pointed to by the primary tag 318 will be used on all future booting of computing system 100.

At action 442 of FIG. 4B, either OS 102 or BIOS 104 (depending on the implementation) loads a patch into system memory. Actions 442 through 450 may be performed any subsequent time a patch is loaded by the OS or the BIOS. At action 444, OS 102 or BIOS 104 sends a Patch Commit instruction to a core 401 of processor 200. Core 401 sends the patch (as referenced by an address in system memory where the patch is stored) to security controller 202 at action 446. Security controller 202 saves the patch to a patch region of secure patch memory 204 pointed to by secondary tag 320 at action 448 (since primary tag 318 points to the patch region storing the last known "good" patch (that is, the previously committed patch)). This overwrites the previously stored patch in that patch region. Security controller 202 then downloads the patch from the patch region pointed to by the secondary tag to one or more individual IP blocks 206 and/or core(s) 401 at action 450.

If the patch is invalid and/or unacceptable (as determined by OS 102 or BIOS 104), the patch may be rolled back. At action 452, OS 102 or BIOS 104 sends another Patch Commit instruction, this time with an operation indicating a commit flag set to false, to core 401. In one implementation, at action 452, the Patch Commit has the EAX=0 and the EBX=0 (patch rollback). Core 401 sends a "patch rollback" command to security controller 202 at action 454 to instruct the security controller that the patch should no longer be used in computing system 100 and the last known "good" patch should be used instead. At action 456, security controller 202 sends the patch from the patch region pointed to by the primary tag 318 to the one or more IP blocks, thereby implementing the rollback. The primary/secondary designations of the two patch regions remains the same. The patch stored in the patch region pointed to by the primary tag 318 will be used on all future booting of computing system 100. The patch currently stored in the patch region pointed to by the secondary tag 320 is not to be used and may be subsequently overwritten by a new patch in the future, as needed.

Figure 5A:
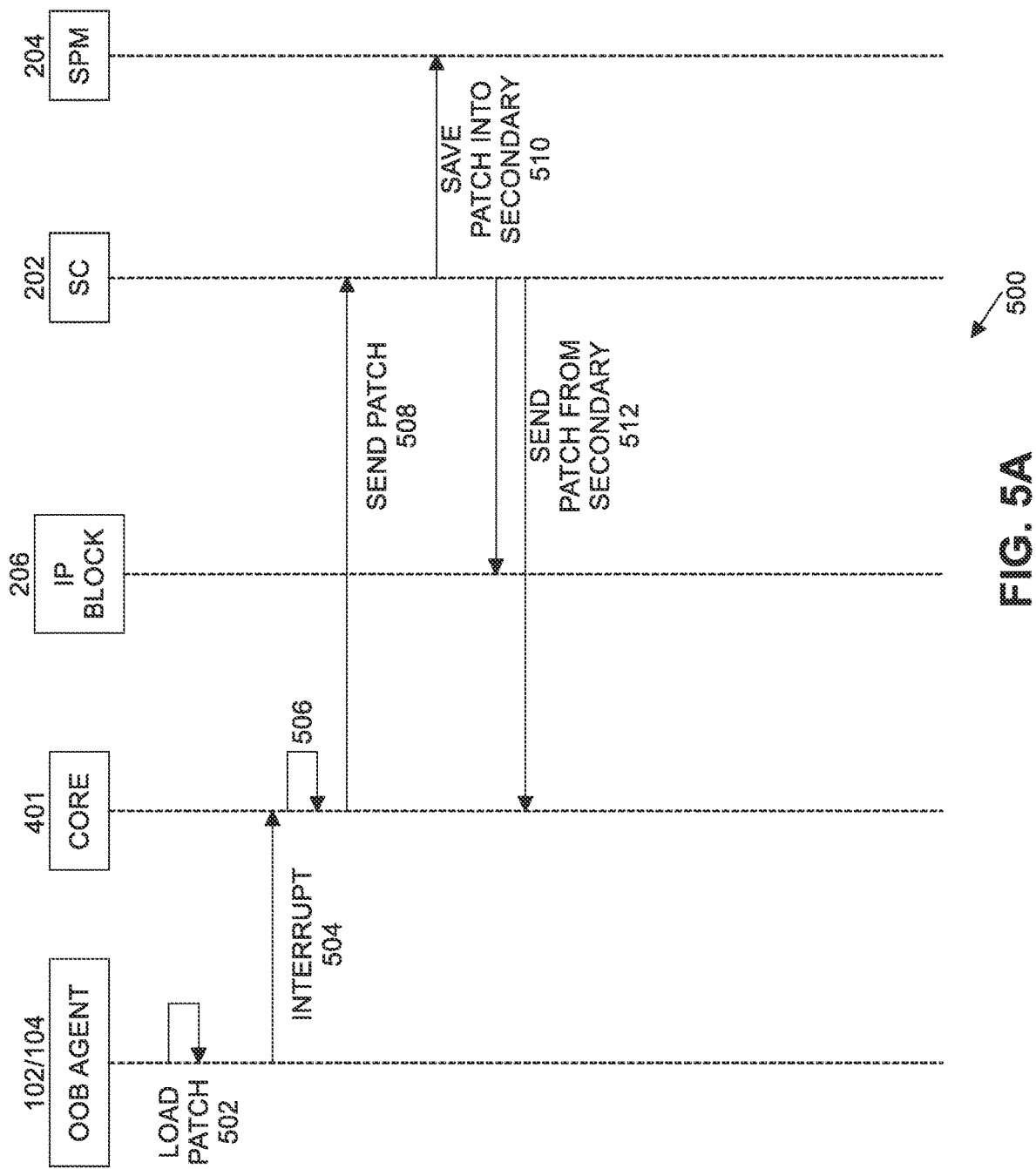
Figure 5C:
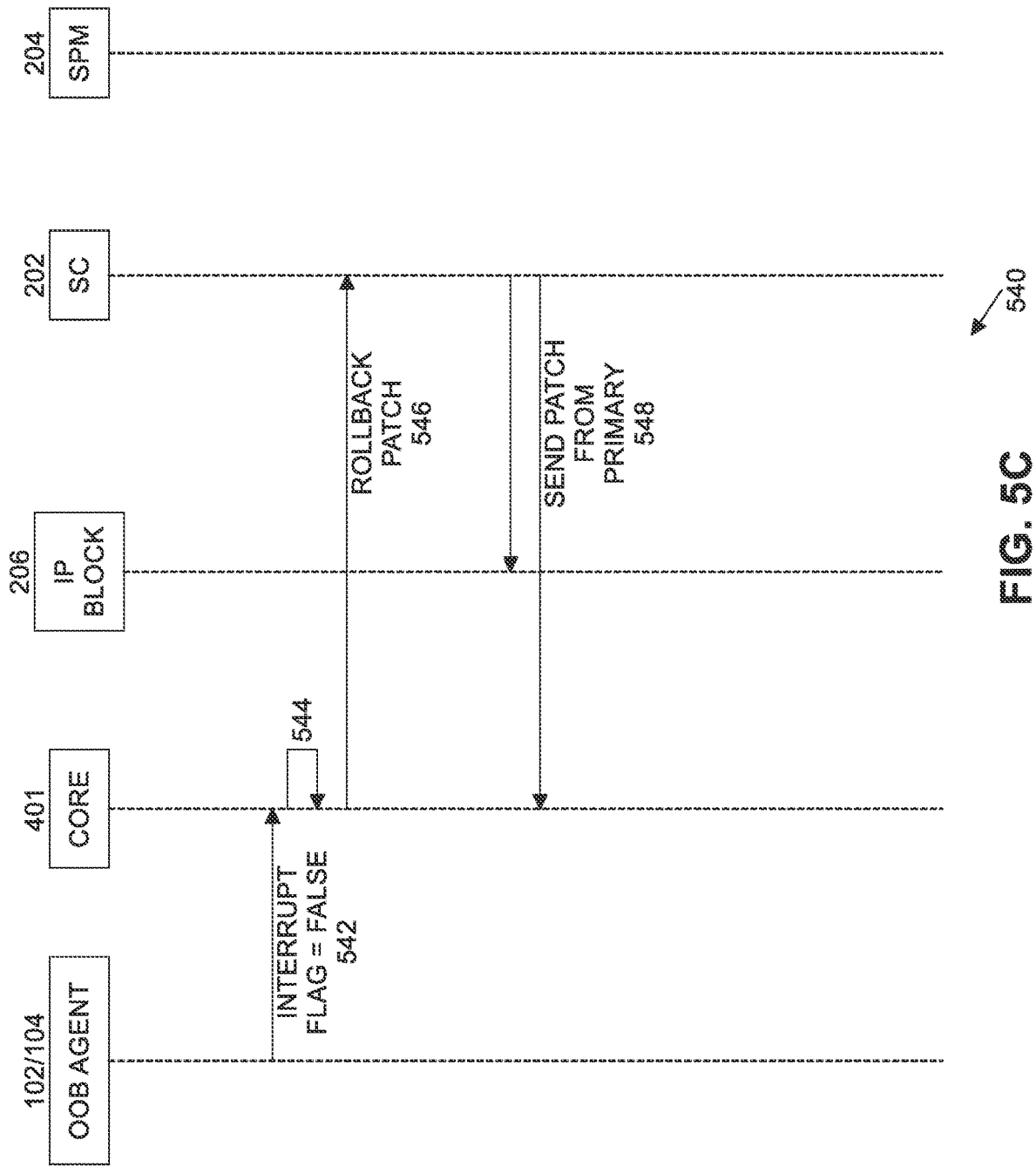

FIG. 5A-C illustrates patch rollback operations for an out of band agent (such as BMC 112 or an agent running on a computing system other than computing system 100) according to one implementation. Upon booting of computing system 100, BIOS 104 loads a patch from FIT 126 of flash memory 124 into system memory. For subsequent runtime patching, at action 502 of FIG. 5A, out of band (OOB) agent loads a patch into system memory. In one implementation, the patch is retrieved from a memory or storage accessible to processor 200. At action 504, OOB agent sends an interrupt with a commit flag set to true to core 401 of processor 200. At action 506, core 401 executes a Patch Commit instruction. Core 401 then sends the patch (as referenced by an address in system memory where the patch is stored) to security controller 202 at action 508. Security controller 202 saves the patch to a patch region of secure patch memory 204 pointed to by secondary tag 320 at action 510 (since primary tag 318 points to the patch region storing the last known "good" patch). Security controller 202 then downloads the patch from the patch region pointed to by the secondary tag to one or more individual IP blocks 206 and/or core(s) at action 512.

If the patch is valid and/or acceptable (as determined by OOB agent (e.g., BMC)), the patch may be committed. At action 522 of FIG. 5B, OOB agent sends an interrupt, with a commit flag set to true, to core 401. At action 524, core 401 executes a Patch Commit instruction. Core 401 sends a "patch permanent" command to security controller 202 at action 526 to instruct the security controller that the patch should be continued to be used in computing system 100. At action 528, security controller 202 updates the region tags 318, 320. In one implementation, security controller 202 updates the secondary tag 320 to point to the patch region pointed to by the primary tag 318 and then updates the primary tag 318 to point to the patch region storing the newly committed patch. This flips the primary/secondary designations of the two patch regions. The patch stored in the patch region pointed to by the primary tag 318 will be used on all future booting of computing system 100.

If the patch is invalid and/or unacceptable (as determined by the OOB agent), the patch may be rolled back. At action 542 of FIG. 5C, OOB agent sends an interrupt, this time indicating a commit flag set to false, to core 401. At action 544, core 401 executes a Patch Commit instruction. Core 401 sends a "patch rollback" command to security controller 202 at action 456 to instruct the security controller that the patch should no longer be used in computing system 100 and the last known "good" patch should be used instead. At action 458, security controller 202 sends the patch from the patch region pointed to by the primary tag 318 to the one or more IP blocks and/or core(s), thereby implementing the rollback. The primary/secondary designations of the two patch regions remains the same. The patch stored in the patch region pointed to by the primary tag 318 will be used on all future booting of computing system 100. The patch currently stored in the patch region pointed to by the secondary tag 320 is not to be used and may be subsequently overwritten by a new patch in the future, as needed.

Figure 6:
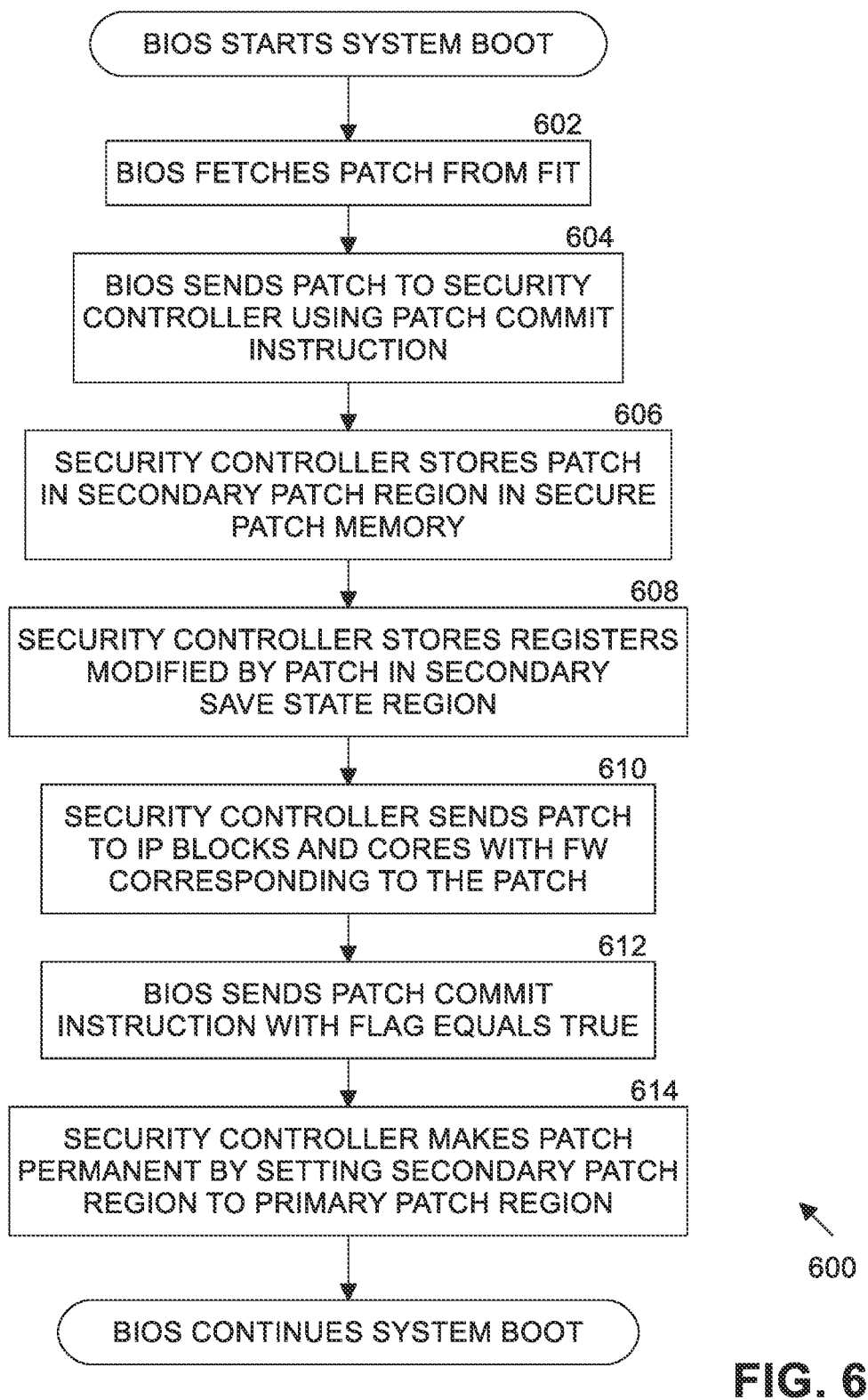
FIG. 6 is a flow diagram illustrating initial patch loading processing according to one implementation.

FIG. 6 is a flow diagram illustrating initial patch loading processing 600 according to one implementation. After BIOS 104 starts a system boot, at block 602 the BIOS fetches a patch from FIT 126. At block 604, the BIOS sends the patch to security controller 202 using the Patch Commit instruction 106. At block 606, the security controller stores the patch in the secondary patch region, that is, the path region in secure patch memory 204 pointed to by secondary tag 320. At block 608, security controller 202 stores registers modified by the patch in the secondary save state region, that is, the save state region in secure patch memory 204 associated with the secondary patch region. At block 610, the security controller sends the patch to one or more IP blocks 206, 210, . . . 214 and core(s) 401 in processor 200 that have firmware corresponding to the patch. At block 612, BIOS 104 sends a Patch Commit instruction 106 to processor 200 with a flag set to true to indicate a "patch permanent" state for the patch. As part of the execution of the Patch Commit instruction by the processor, at block 614, security controller 202 makes the patch permanent by setting the secondary path region to the primary patch region. In one implementation, the security controller sets the primary tag 318 to the location in secure patch memory 204 pointed to by secondary tag 320. The primary patch region, pointed to by primary tag 318, always stores the latest known "good" patch. The BIOS then continues with booting of computing system 100.

Figure 7:
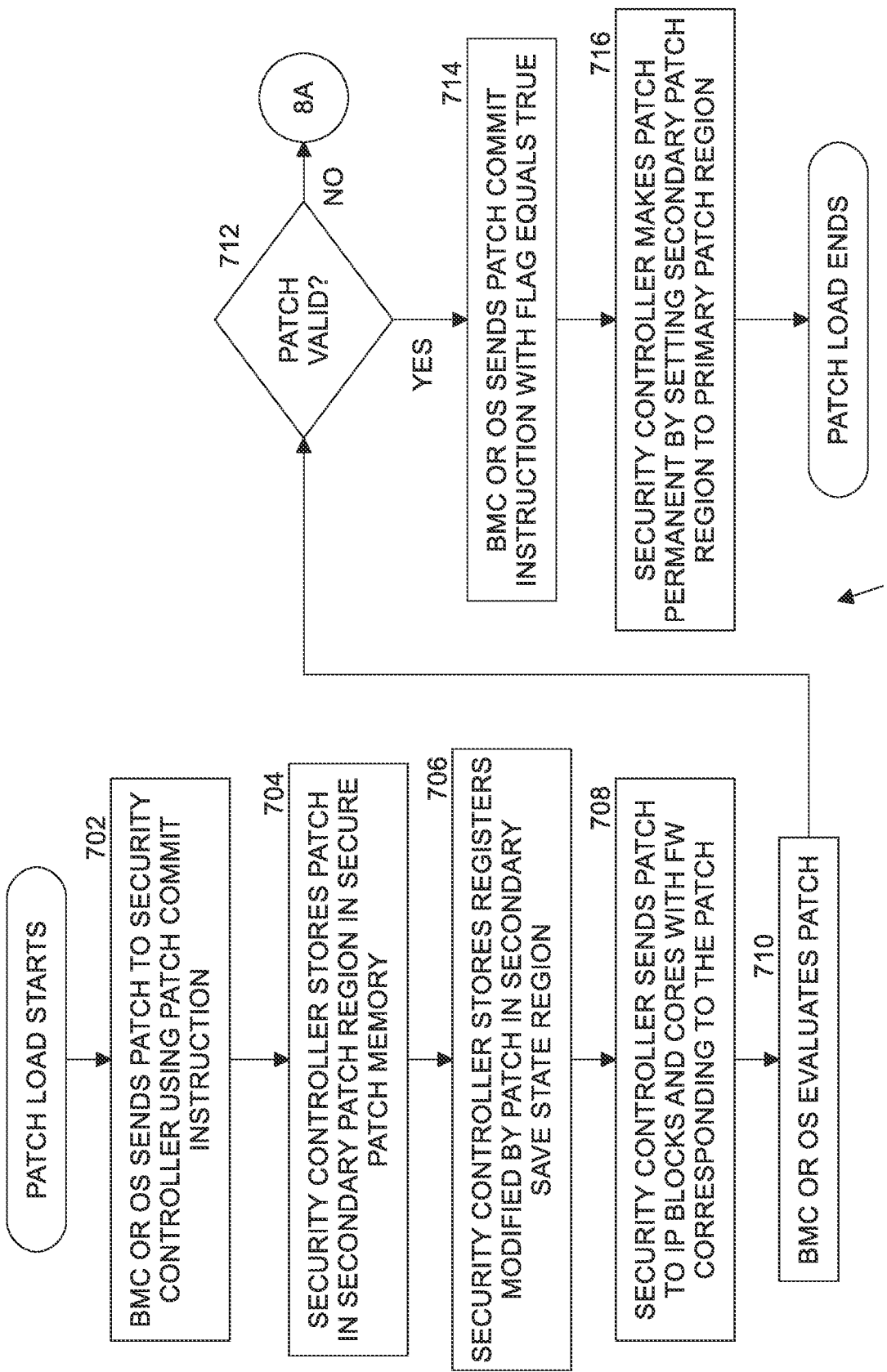
FIGS. 7 and 8 are flow diagrams illustrating runtime patch loading and rollback processing according to one implementation.
Figure 8:
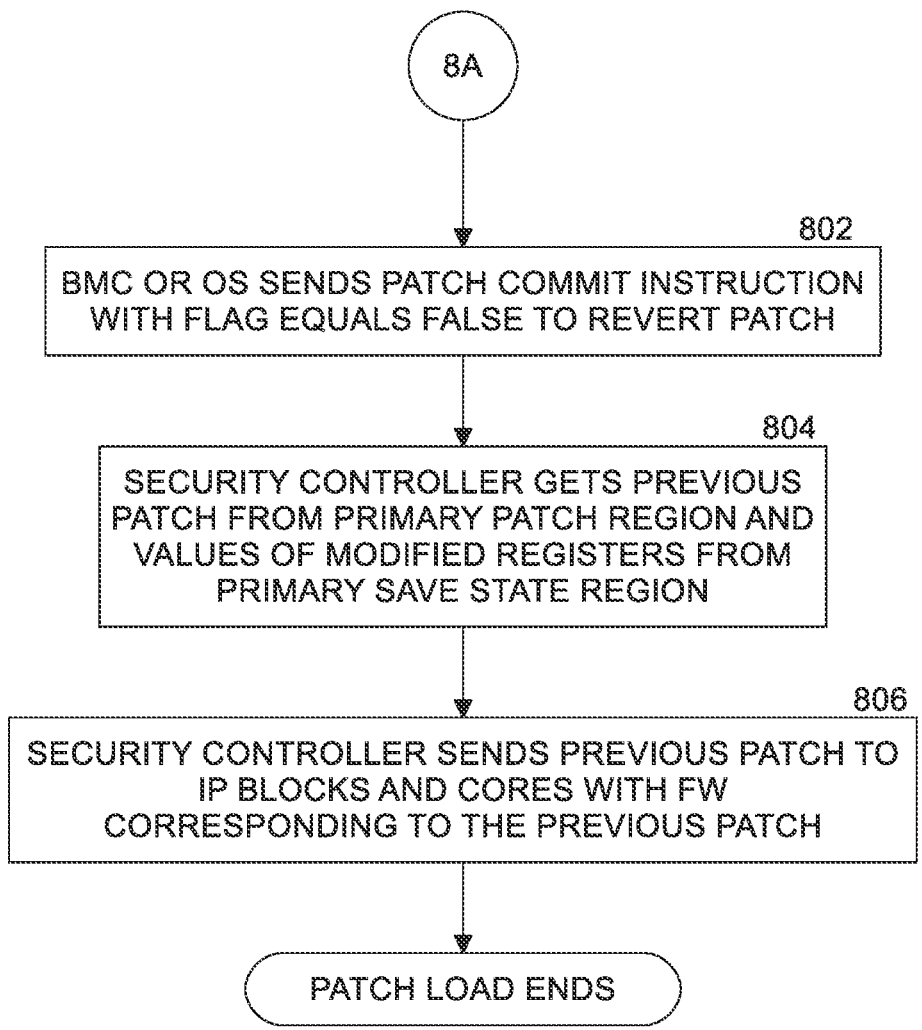

FIGS. 7 and 8 are flow diagrams illustrating runtime patch loading and rollback processing 700 according to one implementation. The operations may be performed during a BMC or OS-based runtime patch loading. After patch loading starts, at block 704, the BMC 112 or OS 102 sends the patch to security controller 202 using the Patch Commit instruction 106. At block 704, the security controller stores the patch in the secondary patch region, that is, the path region in secure patch memory 204 pointed to by secondary tag 320. At block 706, security controller 202 stores registers modified by the patch in the secondary save state region, that is, the save state region in secure patch memory 204 associated with the secondary patch region. At block 708, the security controller sends the patch to one or more IP blocks 206, 210, . . . 214 and core(s) 401 in processor 200 that have firmware corresponding to the patch. At block 710, the patch is evaluated. In one implementation, this may include performing processing by computing system 100 over time and analyzing by BMC 112 or OS 102 one or more performance indicators. The BMC or OS determines whether the patch is valid or invalid.

At block 712, if the patch is valid, then at block 714 the BMC 112 or the OS 102 (depending on the implementation) sends a Patch Commit instruction 106 to processor 200 with a flag set to true to indicate a "patch permanent" state for the patch. As part of the execution of the Patch Commit instruction by the processor, at block 716, security controller 202 makes the patch permanent by setting the secondary path region to the primary patch region. In one implementation, the security controller sets the primary tag 318 to the location in secure patch memory 204 pointed to by secondary tag 320. The primary patch region, pointed to by primary tag 318, always stores the latest known "good" patch. Runtime patch loading ends.

At block 712, if the patch is invalid, then processing continues at block 802 of FIG. 8 via connector 8A. At block 802, the BMC 112 or the OS 102 (depending on the implementation) sends a Patch Commit instruction 106 to processor 200 with a flag set to false to indicate a "patch rollback" state for reverting the patch. As part of the execution of the Patch Commit instruction by the processor, at block 804, security controller 202 gets a previous patch from the primary patch region and values of modified registers from the primary save state region. At block 806, the security controller sends the previous patch and values of modified registers to one or more IP blocks and core(s) with firmware corresponding to the previous patch. Runtime patch loading ends.

Exemplary Computer Architectures

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 9:
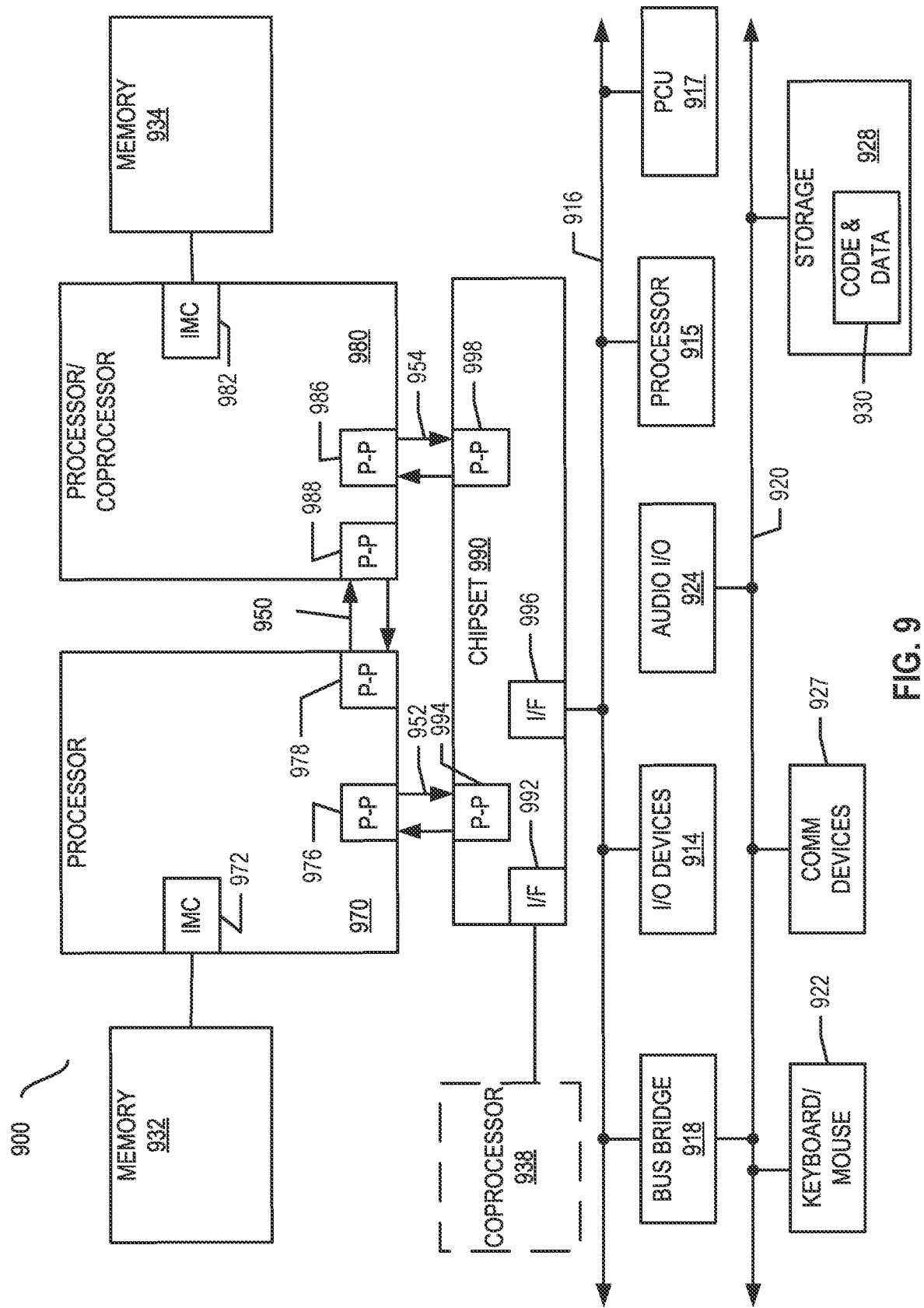
FIG. 9 illustrates an exemplary system.

FIG. 9 illustrates an exemplary system. Multiprocessor system 900 is a point-to-point interconnect system and includes a plurality of processors including a first processor 970 and a second processor 980 coupled via a point-to-point interconnect 950. In some examples, the first processor 970 and the second processor 980 are homogeneous. In some examples, first processor 970 and the second processor 980 are heterogenous.

Processors 970 and 980 are shown including integrated memory controller (IMC) units circuitry 972 and 982, respectively. Processor 970 also includes as part of its interconnect controller units point-to-point (P-P) interfaces 976 and 978; similarly, second processor 980 includes P-P interfaces 986 and 988. Processors 970, 980 may exchange information via the point-to-point (P-P) interconnect 950 using P-P interface circuits 978, 988. IMCs 972 and 982 couple the processors 970, 980 to respective memories, namely a memory 932 and a memory 934, which may be portions of main memory locally attached to the respective processors.

Processors 970, 980 may each exchange information with a chipset 990 via individual P-P interconnects 952, 954 using point to point interface circuits 976, 994, 986, 998. Chipset 990 may optionally exchange information with a co-processor 938 via a high-performance interface 992. In some examples, the co-processor 938 is a special-purpose processor, such as, for example, a high-throughput processor, a network or communication processor, compression engine, graphics processor, general purpose graphics processing unit (GPGPU), embedded processor, or the like.

A shared cache (not shown) may be included in either processor 970, 980 or outside of both processors, yet connected with the processors via P-P interconnect, such that either or both processors' local cache information may be stored in the shared cache if a processor is placed into a low power mode.

Chipset 990 may be coupled to a first interconnect 916 via an interface 996. In some examples, first interconnect 916 may be a Peripheral Component Interconnect (PCI) interconnect, or an interconnect such as a PCI Express interconnect or another I/O interconnect. In some examples, one of the interconnects couples to a power control unit (PCU) 917, which may include circuitry, software, and/or firmware to perform power management operations with regard to the processors 970, 980 and/or co-processor 938. PCU 917 provides control information to a voltage regulator (not shown) to cause the voltage regulator to generate the appropriate regulated voltage. PCU 917 also provides control information to control the operating voltage generated. In various examples, PCU 917 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 917 is illustrated as being present as logic separate from the processor 970 and/or processor 980. In other cases, PCU 917 may execute on a given one or more of cores (not shown) of processor 970 or 980. In some cases, PCU 917 may be implemented as a microcontroller (dedicated or general-purpose) or other control logic configured to execute its own dedicated power management code, sometimes referred to as P-code. In yet other examples, power management operations to be performed by PCU 917 may be implemented externally to a processor, such as by way of a separate power management integrated circuit (PMIC) or another component external to the processor. In yet other examples, power management operations to be performed by PCU 917 may be implemented within BIOS or other system software.

Various I/O devices 914 may be coupled to first interconnect 916, along with a bus bridge 918 which couples first interconnect 916 to a second interconnect 920. In some examples, one or more additional processor(s) 915, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 916. In some examples, second interconnect 920 may be a low pin count (LPC) interconnect. Various devices may be coupled to second interconnect 920 including, for example, a keyboard and/or mouse 922, communication devices 927 and a storage circuitry 928. Storage circuitry 928 may be a disk drive or other mass storage device which may include instructions/code and data 930, in some examples. Further, an audio I/O 924 may be coupled to second interconnect 920. Note that other architectures than the point-to-point architecture described above are possible. For example, instead of the point-to-point architecture, a system such as multiprocessor system 900 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 10:
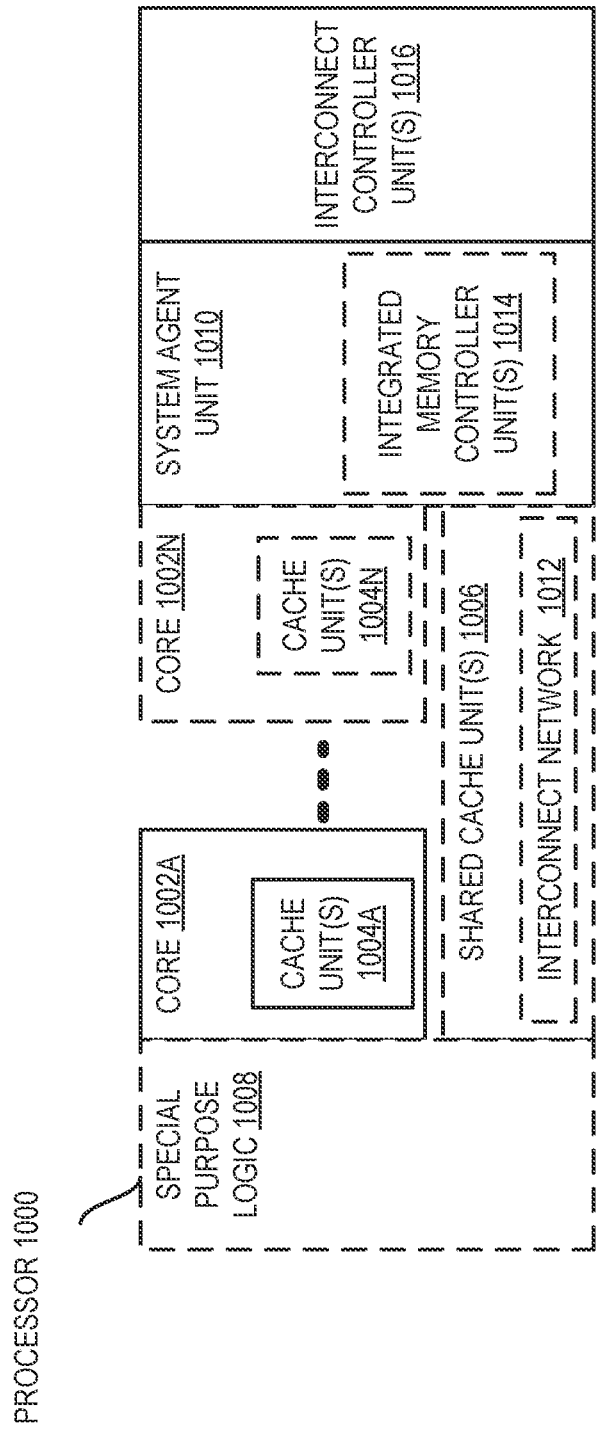
FIG. 10 illustrates a block diagram of an example processor that may have more than one core and an integrated memory controller.

FIG. 10 illustrates a block diagram of an example processor 1000 that may have more than one core and an integrated memory controller. The solid lined boxes illustrate a processor 1000 with a single core 1002A, a system agent 1010, a set of one or more interconnect controller unit(s) circuitry 1016, while the optional addition of the dashed lined boxes illustrates an alternative processor 1000 with multiple cores 1002(A)-(N), a set of one or more integrated memory controller unit(s) circuitry 1014 in the system agent unit circuitry 1010, and special purpose logic 1008, as well as a set of one or more interconnect controller units circuitry 1016. Note that the processor 1000 may be one of the processors 970 or 980, or co-processor 938 or 915 of FIG. 9.

Thus, different implementations of the processor 1000 may include: 1) a CPU with the special purpose logic 1008 being integrated graphics and/or scientific (throughput) logic (which may include one or more cores, not shown), and the cores 1002(A)-(N) being one or more general purpose cores (e.g., general purpose in-order cores, general purpose out-of-order cores, or a combination of the two); 2) a coprocessor with the cores 1002(A)-(N) being a large number of special purpose cores intended primarily for graphics and/or scientific (throughput); and 3) a coprocessor with the cores 1002(A)-(N) being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, bipolar complementary metal oxide semiconductor (CMOS) (BiCMOS), CMOS, or N-type metal oxide semiconductor (NMOS).

A memory hierarchy includes one or more levels of cache unit(s) circuitry 1004(A)-(N) within the cores 1002(A)-(N), a set of one or more shared cache unit(s) circuitry 1006, and external memory (not shown) coupled to the set of integrated memory controller unit(s) circuitry 1014. The set of one or more shared cache unit(s) circuitry 1006 may include one or more mid-level caches, such as level 2 (L2), level 3 (L3), level 4 (L4), or other levels of cache, such as a last level cache (LLC), and/or combinations thereof. While in some examples ring-based interconnect network circuitry 1012 interconnects the special purpose logic 1008 (e.g., integrated graphics logic), the set of shared cache unit(s) circuitry 1006, and the system agent unit circuitry 1010, alternative examples use any number of well-known techniques for interconnecting such units. In some examples, coherency is maintained between one or more of the shared cache unit(s) circuitry 1006 and cores 1002(A)-(N).

In some examples, one or more of the cores 1002(A)-(N) are capable of multi-threading. The system agent unit circuitry 1010 includes those components coordinating and operating cores 1002(A)-(N). The system agent unit circuitry 1010 may include, for example, power control unit (PCU) circuitry and/or display unit circuitry (not shown). The PCU may be or may include logic and components needed for regulating the power state of the cores 1002(A)-(N) and/or the special purpose logic 1008 (e.g., integrated graphics logic). The display unit circuitry is for driving one or more externally connected displays.

The cores 1002(A)-(N) may be homogenous or heterogeneous in terms of architecture instruction set architecture (ISA); that is, two or more of the cores 1002(A)-(N) may be capable of executing the same ISA, while other cores may be capable of executing only a subset of that ISA or a ISA.

Exemplary Core Architectures—In-Order and Out-of-Order Core Block Diagram

Figure 11A:
FIG. 11(A) is a block diagram illustrating both an exemplary in-order pipeline and an exemplary register renaming, out-of-order issue/execution pipeline according to examples.
Figure 11B:
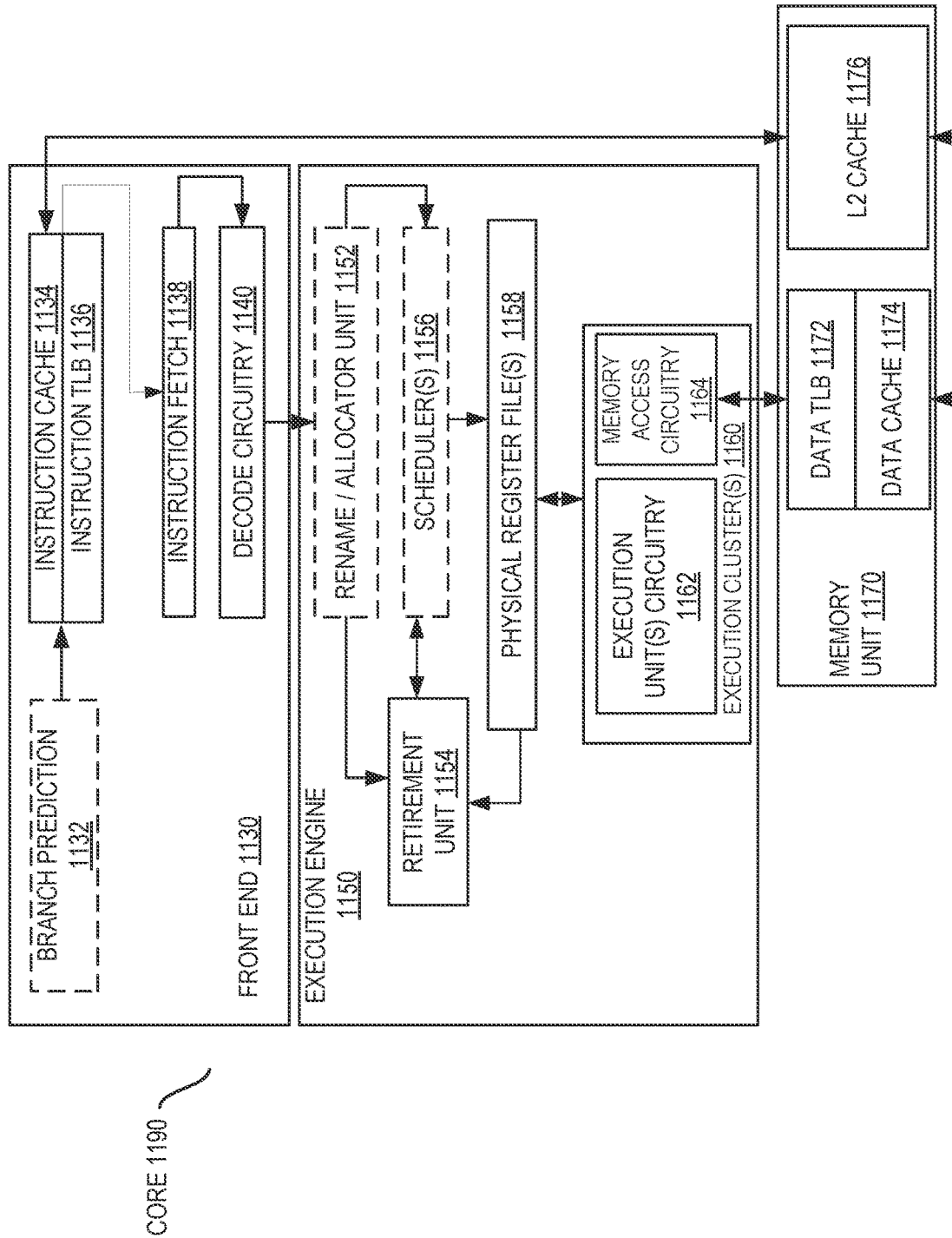
FIG. 11(B) is a block diagram illustrating both an exemplary example of an in-order architecture core and an exemplary register renaming, out-of-order issue/execution architecture core to be included in a processor according to examples.

FIG. 11(A) is a block diagram illustrating both an exemplary in-order pipeline and an exemplary register renaming, out-of-order issue/execution pipeline according to examples. FIG. 11(B) is a block diagram illustrating both an exemplary example of an in-order architecture core and an exemplary register renaming, out-of-order issue/execution architecture core to be included in a processor according to examples. The solid lined boxes in FIGS. 11(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11(A), a processor pipeline 1100 includes a fetch stage 1102, an optional length decoding stage 1104, a decode stage 1106, an optional allocation (Alloc) stage 1108, an optional renaming stage 1110, a schedule (also known as a dispatch or issue) stage 1112, an optional register read/memory read stage 1114, an execute stage 1116, a write back/memory write stage 1118, an optional exception handling stage 1122, and an optional commit stage 1124. One or more operations can be performed in each of these processor pipeline stages. For example, during the fetch stage 1102, one or more instructions are fetched from instruction memory, during the decode stage 1106, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1106 and the register read/memory read stage 1114 may be combined into one pipeline stage. In one example, during the execute stage 1116, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution core architecture may implement the pipeline 1100 as follows: 1) the instruction fetch 1138 performs the fetch and length decoding stages 1102 and 1104; 2) the decode circuitry 1140 performs the decode stage 1106; 3) the rename/allocator unit circuitry 1152 performs the allocation stage 1108 and renaming stage 1110; 4) the scheduler(s) circuitry 1156 performs the schedule stage 1112; 5) the physical register file(s) circuitry 1158 and the memory unit circuitry 1170 perform the register read/memory read stage 1114; the execution cluster(s) 1160 perform the execute stage 1116; 6) the memory unit circuitry 1170 and the physical register file(s) circuitry 1158 perform the write back/memory write stage 1118; 7) various circuitry may be involved in the exception handling stage 1122; and 8) the retirement unit circuitry 1154 and the physical register file(s) circuitry 1158 perform the commit stage 1124.

FIG. 11(B) shows processor core 1190 including front-end unit circuitry 1130 coupled to an execution engine unit circuitry 1150, and both are coupled to a memory unit circuitry 1170. The core 1190 may be a reduced instruction set architecture computing (RISC) core, a complex instruction set architecture computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit circuitry 1130 may include branch prediction circuitry 1132 coupled to an instruction cache circuitry 1134, which is coupled to an instruction translation lookaside buffer (TLB) 1136, which is coupled to instruction fetch circuitry 1138, which is coupled to decode circuitry 1140. In one example, the instruction cache circuitry 1134 is included in the memory unit circuitry 1170 rather than the front-end circuitry 1130. The decode circuitry 1140 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1140 may further include an address generation unit circuitry (AGU, not shown). In one example, the AGU generates an LSU address using forwarded register ports, and may further perform branch forwarding (e.g., immediate offset branch forwarding, LR register branch forwarding, etc.). The decode circuitry 1140 may be implemented using various different mechanisms. Examples of suitable mechanisms include, but are not limited to, look-up tables, hardware implementations, programmable logic arrays (PLAs), microcode read only memories (ROMs), etc. In one example, the core 1190 includes a microcode ROM (not shown) or other medium that stores microcode for certain macroinstructions (e.g., in decode circuitry 1140 or otherwise within the front end circuitry 1130). In one example, the decode circuitry 1140 includes a micro-operation (micro-op) or operation cache (not shown) to hold/cache decoded operations, micro-tags, or micro-operations generated during the decode or other stages of the processor pipeline 1100. The decode circuitry 1140 may be coupled to rename/allocator unit circuitry 1152 in the execution engine circuitry 1150.

The execution engine circuitry 1150 includes the rename/allocator unit circuitry 1152 coupled to a retirement unit circuitry 1154 and a set of one or more scheduler(s) circuitry 1156. The scheduler(s) circuitry 1156 represents any number of different schedulers, including reservations stations, central instruction window, etc. In some examples, the scheduler(s) circuitry 1156 can include arithmetic logic unit (ALU) scheduler/scheduling circuitry, ALU queues, arithmetic generation unit (AGU) scheduler/scheduling circuitry, AGU queues, etc. The scheduler(s) circuitry 1156 is coupled to the physical register file(s) circuitry 1158. Each of the physical register file(s) circuitry 1158 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1158 includes vector registers unit circuitry, write-mask registers unit circuitry, and scalar register unit circuitry. These register units may provide architectural vector registers, vector mask registers, general-purpose registers, etc. The physical register file(s) circuitry 1158 is overlapped by the retirement unit circuitry 1154 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1154 and the physical register file(s) circuitry 1158 are coupled to the execution cluster(s) 1160. The execution cluster(s) 1160 includes a set of one or more execution unit(s) circuitry 1162 and a set of one or more memory access circuitry 1164. The execution unit(s) circuitry 1162 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1156, physical register file(s) circuitry 1158, and execution cluster(s) 1160 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1164). It should also be understood that where separate pipelines are used, one or more of these pipelines may be out-of-order issue/execution and the rest in-order.

In some examples, the execution engine unit circuitry 1150 may perform load store unit (LSU) address/data pipelining to an Advanced Microcontroller Bus (AMB) interface (not shown), and address phase and writeback, data phase load, store, and branches.

The set of memory access circuitry 1164 is coupled to the memory unit circuitry 1170, which includes data TLB circuitry 1172 coupled to a data cache circuitry 1174 coupled to a level 2 (L2) cache circuitry 1176. In one exemplary example, the memory access circuitry 1164 may include a load unit circuitry, a store address unit circuit, and a store data unit circuitry, each of which is coupled to the data TLB circuitry 1172 in the memory unit circuitry 1170. The instruction cache circuitry 1134 is further coupled to a level 2 (L2) cache circuitry 1176 in the memory unit circuitry 1170. In one example, the instruction cache 1134 and the data cache 1174 are combined into a single instruction and data cache (not shown) in L2 cache circuitry 1176, a level 3 (L3) cache circuitry (not shown), and/or main memory. The L2 cache circuitry 1176 is coupled to one or more other levels of cache and eventually to a main memory.

The core 1190 may support one or more instructions sets (e.g., the x86 instruction set architecture (with some extensions that have been added with newer versions); the MIPS instruction set architecture; the ARM instruction set architecture (with optional additional extensions such as NEON)), including the instruction(s) described herein. In one example, the core 1190 includes logic to support a packed data instruction set architecture extension (e.g., AVX1, AVX2), thereby allowing the operations used by many multimedia applications to be performed using packed data.

Exemplary Execution Unit(s) Circuitry

Figure 12:
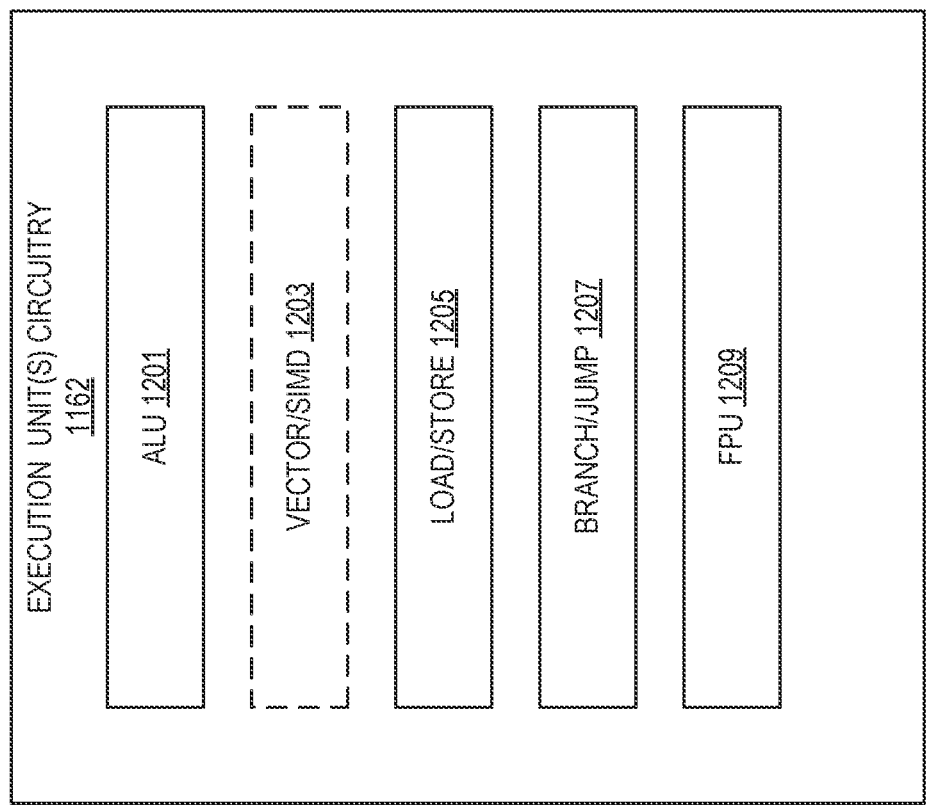
FIG. 12 illustrates examples of execution unit(s) circuitry, such as the execution unit(s) circuitry of FIG. 11(B).

FIG. 12 illustrates examples of execution unit(s) circuitry, such as execution unit(s) circuitry 1162 of FIG. 11(B). As illustrated, execution unit(s) circuitry 1162 may include one or more ALU circuits 1201, vector/single instruction multiple data (SIMD) circuits 1203, load/store circuits 1205, and/or branch/jump circuits 1207. ALU circuits 1201 perform integer arithmetic and/or Boolean operations. Vector/SIMD circuits 1203 perform vector/SIMD operations on packed data (such as SIMD/vector registers). Load/store circuits 1205 execute load and store instructions to load data from memory into registers or store from registers to memory. Load/store circuits 1205 may also generate addresses. Branch/jump circuits 1207 cause a branch or jump to a memory address depending on the instruction. Floating-point unit (FPU) circuits 1209 perform floating-point arithmetic. The width of the execution unit(s) circuitry 1162 varies depending upon the example and can range from 16-bit to 1,024-bit. In some examples, two or more smaller execution units are logically combined to form a larger execution unit (e.g., two 128-bit execution units are logically combined to form a 256-bit execution unit).

Exemplary Register Architecture

Figure 13:
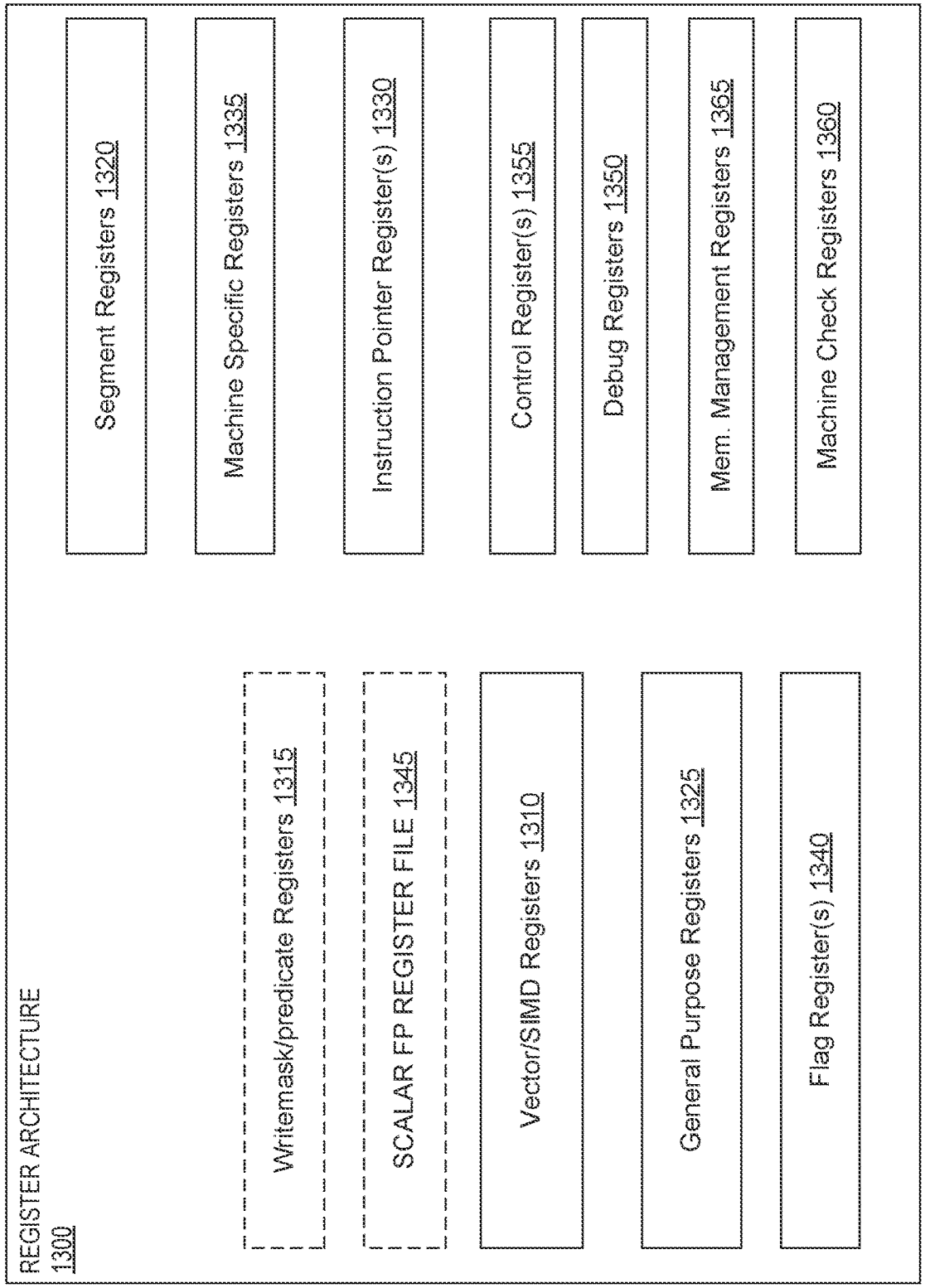
FIG. 13 is a block diagram of a register architecture according to some examples.

FIG. 13 is a block diagram of a register architecture 1300 according to some examples. As illustrated, there are vector/SIMD registers 1310 that vary from 128-bit to 1,024 bits width. In some examples, the vector/SIMD registers 1310 are physically 512-bits and, depending upon the mapping, only some of the lower bits are used. For example, in some examples, the vector/SIMD registers 1310 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1300 includes writemask/predicate registers 1315. For example, in some examples, there are 8 writemask/predicate registers (sometimes called k0 through k7) that are each 16-bit, 32-bit, 64-bit, or 128-bit in size. Writemask/predicate registers 1315 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1315 corresponds to a data element position of the destination. In other examples, the writemask/predicate registers 1315 are scalable and consists of a set number of enable bits for a given vector element (e.g., 8 enable bits per 64-bit vector element).

The register architecture 1300 includes a plurality of general-purpose registers 1325. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1300 includes scalar floating-point (FP) register 1345 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1340 (e.g., EFLAGS, RFLAGS, etc.) store status and control information for arithmetic, compare, and system operations. For example, the one or more flag registers 1340 may store condition code information such as carry, parity, auxiliary carry, zero, sign, and overflow. In some examples, the one or more flag registers 1340 are called program status and control registers.

Segment registers 1320 contain segment points for use in accessing memory. In some examples, these registers are referenced by the names CS, DS, SS, ES, FS, and GS.

Machine specific registers (MSRs) 1335 control and report on processor performance. Most MSRs 1335 handle system-related functions and are not accessible to an application program. Machine check registers 1360 consist of control, status, and error reporting MSRs that are used to detect and report on hardware errors.

One or more instruction pointer register(s) 1330 store an instruction pointer value. Control register(s) 1355 (e.g., CR0-CR4) determine the operating mode of a processor (e.g., processor 970, 980, 938, 915, and/or 1000) and the characteristics of a currently executing task. Debug registers 1350 control and allow for the monitoring of a processor or core's debugging operations.

Memory (mem) management registers 1365 specify the locations of data structures used in protected mode memory management. These registers may include a GDTR, IDRT, task register, and a LDTR register.

Alternative examples may use wider or narrower registers. Additionally, alternative examples may use more, less, or different register files and registers.

Instruction Set Architectures

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 14:
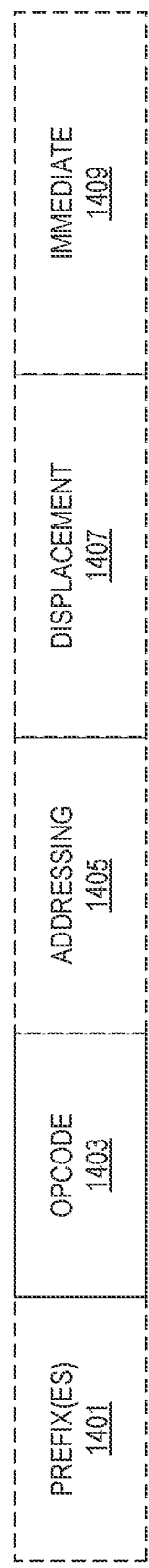
FIG. 14 illustrates examples of an instruction format.

FIG. 14 illustrates examples of an instruction format. As illustrated, an instruction may include multiple components including, but not limited to, one or more fields for: one or more prefixes 1401, an opcode 1403, addressing information 1405 (e.g., register identifiers, memory addressing information, etc.), a displacement value 1407, and/or an immediate value 1409. Note that some instructions utilize some or all of the fields of the format whereas others may only use the field for the opcode 1403. In some examples, the order illustrated is the order in which these fields are to be encoded, however, it should be appreciated that in other examples these fields may be encoded in a different order, combined, etc.

The prefix(es) field(s) 1401, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1403 is used to at least partially define the operation to be performed upon a decoding of the instruction. In some examples, a primary opcode encoded in the opcode field 1403 is one, two, or three bytes in length. In other examples, a primary opcode can be a different length. An additional 3-bit opcode field is sometimes encoded in another field.

Figure 15:
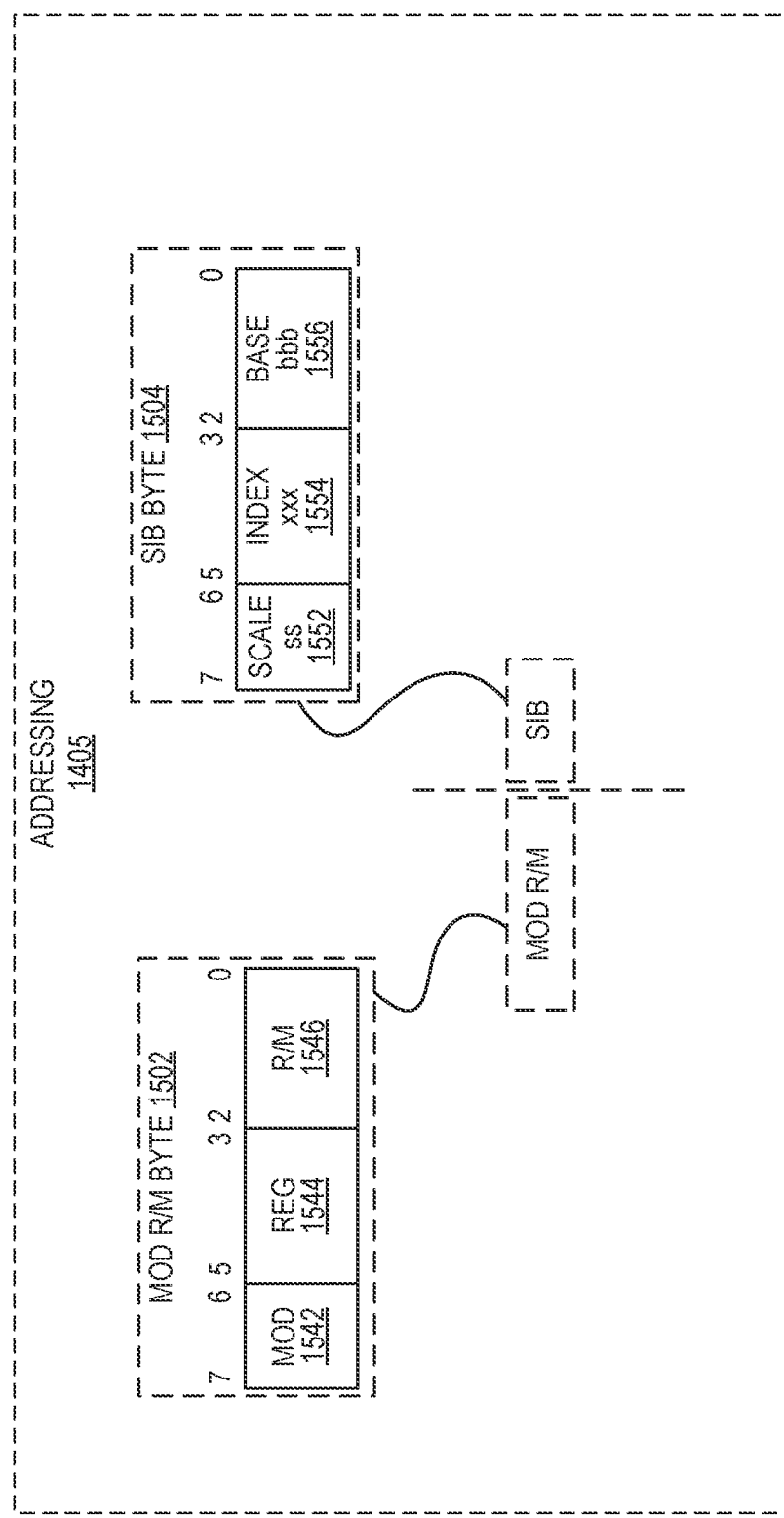
FIG. 15 illustrates examples of an addressing field.

The addressing field 1405 is used to address one or more operands of the instruction, such as a location in memory or one or more registers. FIG. 15 illustrates examples of the addressing field 1405. In this illustration, an optional ModR/M byte 1502 and an optional Scale, Index, Base (SIB) byte 1504 are shown. The ModR/M byte 1502 and the SIB byte 1504 are used to encode up to two operands of an instruction, each of which is a direct register or effective memory address. Note that each of these fields are optional in that not all instructions include one or more of these fields. The MOD R/M byte 1502 includes a MOD field 1542, a register (reg) field 1544, and R/M field 1546.

The content of the MOD field 1542 distinguishes between memory access and non-memory access modes. In some examples, when the MOD field 1542 has a value of b11, a register-direct addressing mode is utilized, and otherwise register-indirect addressing is used.

The register field 1544 may encode either the destination register operand or a source register operand or may encode an opcode extension and not be used to encode any instruction operand. The content of register index field 1544, directly or through address generation, specifies the locations of a source or destination operand (either in a register or in memory). In some examples, the register field 1544 is supplemented with an additional bit from a prefix (e.g., prefix 1401) to allow for greater addressing.

The R/M field 1546 may be used to encode an instruction operand that references a memory address or may be used to encode either the destination register operand or a source register operand. Note the R/M field 1546 may be combined with the MOD field 1542 to dictate an addressing mode in some examples.

The SIB byte 1504 includes a scale field 1552, an index field 1554, and a base field 1556 to be used in the generation of an address. The scale field 1552 indicates scaling factor. The index field 1554 specifies an index register to use. In some examples, the index field 1554 is supplemented with an additional bit from a prefix (e.g., prefix 1401) to allow for greater addressing. The base field 1556 specifies a base register to use. In some examples, the base field 1556 is supplemented with an additional bit from a prefix (e.g., prefix 1401) to allow for greater addressing. In practice, the content of the scale field 1552 allows for the scaling of the content of the index field 1554 for memory address generation (e.g., for address generation that uses $2^{scale}*index+base$).

Some addressing forms utilize a displacement value to generate a memory address. For example, a memory address may be generated according to $2^{scale}*index+base+displacement$, index*scale+displacement, r/m+displacement, instruction pointer (RIP/EIP)+displacement, register+displacement, etc. The displacement may be a 1-byte, 2-byte, 4-byte, etc. value. In some examples, a displacement 1407 provides this value. Additionally, in some examples, a displacement factor usage is encoded in the MOD field of the addressing field 1405 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1407.

In some examples, an immediate field 1409 specifies an immediate value for the instruction. An immediate value may be encoded as a 1-byte value, a 2-byte value, a 4-byte value, etc.

FIG. 16 illustrates examples of a first prefix 1401(A). In some examples, the first prefix 1401(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1401(A) may specify up to three registers using 3-bit fields depending on the format: 1) using the reg field 1544 and the R/M field 1546 of the Mod R/M byte 1502; 2) using the Mod R/M byte 1502 with the SIB byte 1504 including using the reg field 1544 and the base field 1556 and index field 1554; or 3) using the register field of an opcode.

In the first prefix 1401(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1544 and MOD R/M R/M field 1546 alone can each only address 8 registers.

In the first prefix 1401(A), bit position 2 (R) may an extension of the MOD R/M reg field 1544 and may be used to modify the ModR/M reg field 1544 when that field encodes a general purpose register, a 64-bit packed data register (e.g., a SSE register), or a control or debug register. R is ignored when Mod R/M byte 1502 specifies other registers or defines an extended opcode.

Bit position 1 (X) X bit may modify the SIB byte index field 1554.

Bit position B (B) B may modify the base in the Mod R/M R/M field 1546 or the SIB byte base field 1556; or it may modify the opcode register field used for accessing general purpose registers (e.g., general purpose registers 1325).

FIGS. 17(A)-(D) illustrate examples of how the R, X, and B fields of the first prefix 1401(A) are used. FIG. 17(A) illustrates R and B from the first prefix 1401(A) being used to extend the reg field 1544 and R/M field 1546 of the MOD R/M byte 1502 when the SIB byte 15 04 is not used for memory addressing. FIG. 17(B) illustrates R and B from the first prefix 1401(A) being used to extend the reg field 1544 and R/M field 1546 of the MOD R/M byte 1502 when the SIB byte 15 04 is not used (register-register addressing). FIG. 17(C) illustrates R, X, and B from the first prefix 1401(A) being used to extend the reg field 1544 of the MOD R/M byte 1502 and the index field 1554 and base field 1556 when the SIB byte 15 04 being used for memory addressing. FIG. 17(D) illustrates B from the first prefix 1401(A) being used to extend the reg field 1544 of the MOD R/M byte 1502 when a register is encoded in the opcode 1403.

FIGS. 18(A)-(B) illustrate examples of a second prefix 1401(B). In some examples, the second prefix 1401(B) is an example of a VEX prefix. The second prefix 1401(B) encoding allows instructions to have more than two operands, and allows SIMD vector registers (e.g., vector/SIMD registers 1310) to be longer than 64-bits (e.g., 128-bit and 256-bit). The use of the second prefix 1401(B) provides for three-operand (or more) syntax. For example, previous two-operand instructions performed operations such as A=A+B, which overwrites a source operand. The use of the second prefix 1401(B) enables operands to perform nondestructive operations such as A=B+C.

In some examples, the second prefix 1401(B) comes in two forms—a two-byte form and a three-byte form. The two-byte second prefix 1401(B) is used mainly for 128-bit, scalar, and some 256-bit instructions; while the three-byte second prefix 1401(B) provides a compact replacement of the first prefix 1401(A) and 3-byte opcode instructions.

FIG. 18(A) illustrates examples of a two-byte form of the second prefix 1401(B). In one example, a format field 1801 (byte 0 1803) contains the value C5H. In one example, byte 1 1805 includes a "R" value in bit[7]. This value is the complement of the same value of the first prefix 1401(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1546 to encode the instruction operand that references a memory address or encode either the destination register operand or a source register operand.

Instructions that use this prefix may use the Mod R/M reg field 1544 to encode either the destination register operand or a source register operand, be treated as an opcode extension and not used to encode any instruction operand.

For instruction syntax that support four operands, vvvv, the Mod R/M R/M field 1546 and the Mod R/M reg field 1544 encode three of the four operands. Bits[7:4] of the immediate 1409 are then used to encode the third source register operand.

FIG. 18(B) illustrates examples of a three-byte form of the second prefix 1401(B). in one example, a format field 1811 (byte 0 1813) contains the value C4H. Byte 1 1815 includes in bits[7:5] "R," "X," and "B" which are the complements of the same values of the first prefix 1401(A). Bits[4:0] of byte 1 1815 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1817 is used similar to W of the first prefix 1401(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1546 to encode the instruction operand that references a memory address or encode either the destination register operand or a source register operand.

Instructions that use this prefix may use the Mod R/M reg field 1544 to encode either the destination register operand or a source register operand, be treated as an opcode extension and not used to encode any instruction operand.

For instruction syntax that support four operands, vvvv, the Mod R/M R/M field 1546, and the Mod R/M reg field 1544 encode three of the four operands. Bits[7:4] of the immediate 1409 are then used to encode the third source register operand.

Figure 19:
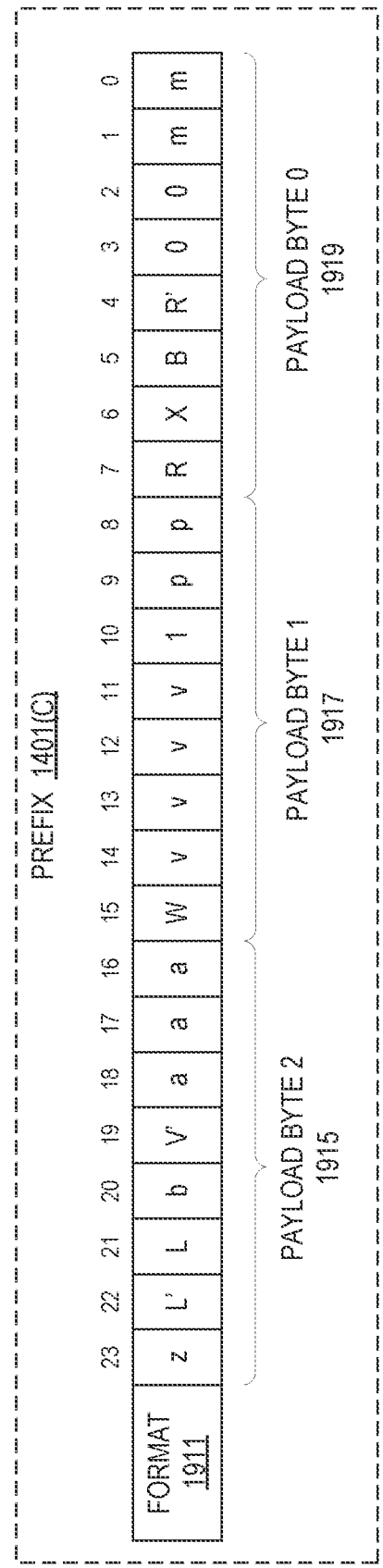
FIG. 19 illustrates examples of a third prefix.

FIG. 19 illustrates examples of a third prefix 1401(C). In some examples, the first prefix 1401(A) is an example of an EVEX prefix. The third prefix 1401(C) is a four-byte prefix.

The third prefix 1401(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 13) or predication utilize this prefix. Opmask register allow for conditional processing or selection control. Opmask instructions, whose source/destination operands are opmask registers and treat the content of an opmask register as a single value, are encoded using the second prefix 1401(B).

The third prefix 1401(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1401(C) is a format field 1911 that has a value, in one example, of 62H. Subsequent bytes are referred to as payload bytes 1915-1919 and collectively form a 24-bit value of P[23:0] providing specific capability in the form of one or more fields (detailed herein).

In some examples, P[1:0] of payload byte 1919 are identical to the low two mmmmm bits. P[3:2] are reserved in some examples. Bit P[4] (R') allows access to the high 16 vector register set when combined with P[7] and the ModR/M reg field 1544. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1544 and ModR/M R/M field 1546. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1401(A) and second prefix 1411(B) and may serve as an opcode extension bit or operand size promotion.

P[18:16] specify the index of a register in the opmask (writemask) registers (e.g., writemask/predicate registers 1315). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 1401(C) are detailed in the following tables.

TABLE 1

32-Register Support in 64-bit Mode

|  | 4 | 3 | [2:0] | REG. TYPE | COMMON USAGES |
|---|---|---|---|---|---|
| REG | R' | R | ModR/M reg | GPR, Vector | Destination or Source |
| VVVV | V' |  | vvvv | GPR, Vector | 2nd Source or Destination |
| RM | X | B | ModR/M R/M | GPR, Vector | 1st Source or Destination |
| BASE |  | 0 | B | ModR/M R/M | GPR | Memory addressing |
| INDEX |  | 0 | X | SIB.index | GPR | Memory addressing |
| VIDX |  | V' | X | SIB.index | Vector | VSIB memory addressing |

TABLE 2

Encoding Register Specifiers in 32-bit Mode

|  | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |

TABLE 2-continued

Encoding Register Specifiers in 32-bit Mode

| | [2:0] | REG. TYPE | COMMON USAGES |
|---|---|---|---|
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, etc.)

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
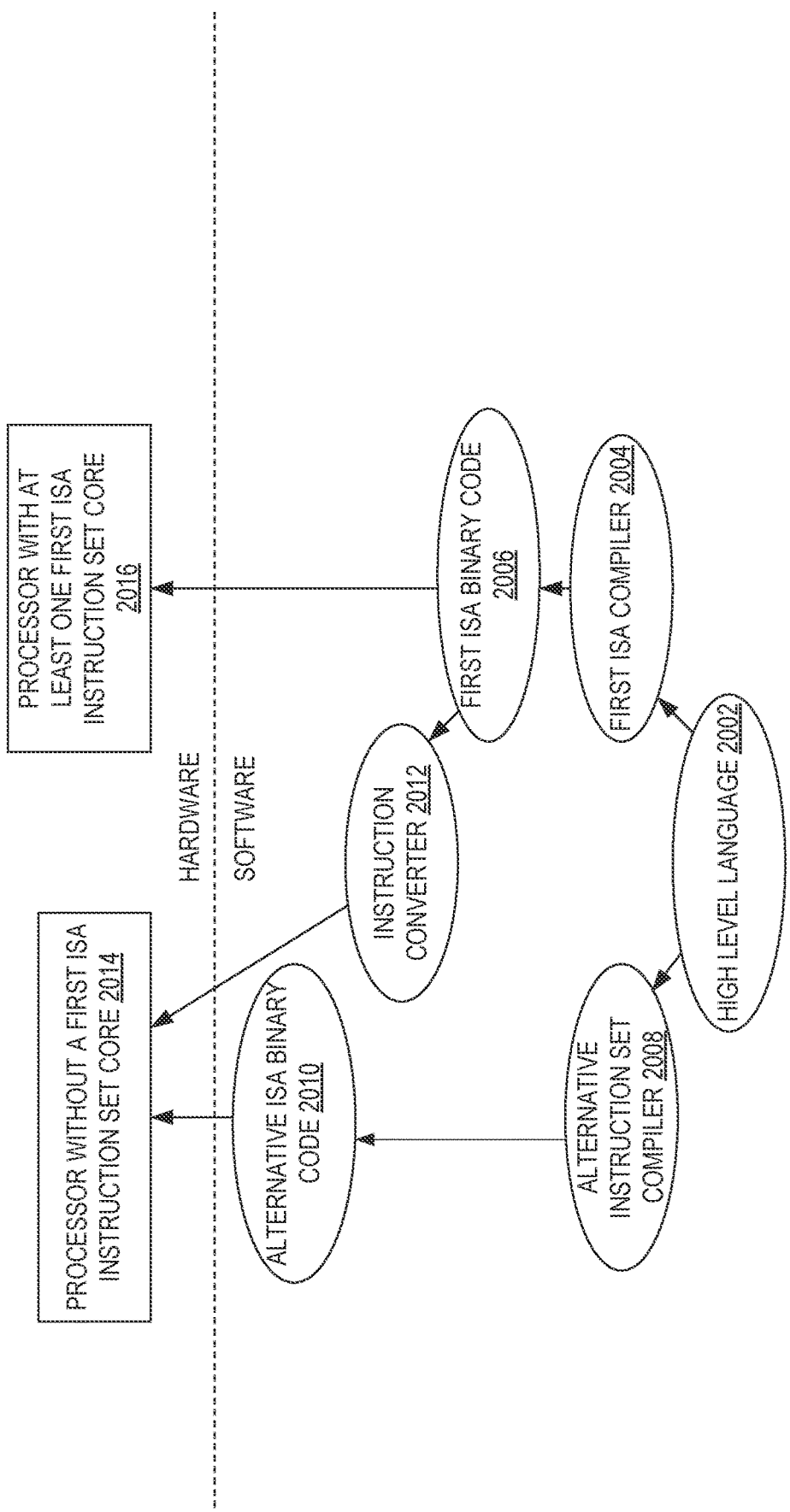
FIG. 20 illustrates a block diagram contrasting the use of a software instruction converter to convert binary instructions in a source instruction set architecture to binary instructions in a target instruction set architecture according to examples.

FIG. 20 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 20 shows a program in a high-level language 2002 may be compiled using a first ISA compiler 2004 to generate first ISA binary code 2006 that may be natively executed by a processor with at least one first instruction set architecture core 2016. The processor with at least one first ISA instruction set architecture core 2016 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 2004 represents a compiler that is operable to generate first ISA binary code 2006 (e.g., object code) that can, with or without additional linkage processing, be executed on the processor with at least one first ISA instruction set architecture core 2016. Similarly, FIG. 20 shows the program in the high-level language 2002 may be compiled using an alternative instruction set architecture compiler 2008 to generate alternative instruction set architecture binary code 2010 that may be natively executed by a processor without a first ISA instruction set architecture core 2014. The instruction converter 2012 is used to convert the first ISA binary code 2006 into code that may be natively executed by the processor without a first ISA instruction set architecture core 2014. This converted code is not likely to be the same as the alternative instruction set architecture binary code 2010 because an instruction converter capable of this is difficult to make; however, the converted code will accomplish the general operation and be made up of instructions from the alternative instruction set architecture. Thus, the instruction converter 2012 represents software, firmware, hardware, or a combination thereof that, through emulation, simulation or any other process, allows a processor or other electronic device that does not have a first ISA instruction set architecture processor or core to execute the first ISA binary code 2006.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

EXAMPLE EMBODIMENTS

The following examples pertain to further embodiments. Specifics in the examples may be used anywhere in one or more embodiments.

Example 1 is an apparatus including one or more intellectual property (IP) blocks; a secure patch memory to store a first firmware patch in a primary patch region and a second firmware patch in a secondary patch region; a processing core to execute a first patch commit instruction; and a security controller to send the second firmware patch to the one or more IP blocks, set the secondary patch region to the primary patch region when the first patch commit instruction indicates the second firmware patch is valid, and get the first firmware patch from the primary patch region and send the first firmware patch to the one or more IP blocks when the first patch commit instruction indicates the second firmware patch is invalid.

In Example 2, the subject matter of Example 1 can optionally include wherein the secure patch memory comprises a primary save state region to store register values modified by the first firmware patch and a secondary save state region to store register values modified by the second firmware patch and the security controller is to store the register values modified by the second firmware patch into the secondary save state region.

In Example 3, the subject matter of Example 2 can optionally include the security controller to get the register values from the primary save state region and send the register values from the primary save state region to the one or more IP blocks when the first patch commit instruction indicates the second firmware patch is invalid.

In Example 4, the subject matter of Example 1 can optionally include the processing core to execute a second patch commit instruction, the second patch commit instruction indicating an address of the second firmware patch in a system memory, and the security controller to get the second firmware patch from the system memory at the address and store the second firmware patch in the secondary patch region in the secure patch memory.

In Example 5, the subject matter of Example 1 can optionally include the processing core to receive the first patch commit instruction and the second patch commit instruction from one of an operating system and a baseboard management controller.

In Example 6, the subject matter of Example 1 can optionally include wherein one of an operating system and a baseboard management controller determines if the second firmware patch is valid or invalid.

In Example 7, the subject matter of Example 1 can optionally include wherein the secure patch memory comprises a plurality of primary patch regions and a plurality of secondary patch regions associated with the plurality of primary patch regions, each of the primary patch regions and the secondary patch regions storing firmware patches for a selected one of more of the one or more IP blocks.

In Example 8, the subject matter of Example 1 can optionally include wherein the processing core to execute a first patch commit instruction; and the security controller to send the second firmware patch to the one or more IP blocks, set the secondary patch region to the primary patch region when the first patch commit instruction indicates the second firmware patch is valid, and get the first firmware patch from the primary patch region and send the first firmware patch to the one or more IP blocks when the first patch commit instruction indicates the second firmware patch is invalid, during runtime of a computing system including the processing core and the security controller.

In Example 9, the subject matter of Example 1 can optionally include wherein the secure patch memory and the security controller are on a same die as the processing core.

In Example 10, the subject matter of Example 1 can optionally include wherein the secure patch memory is accessible only by the security controller.

In Example 11, the subject matter of Example 1 can optionally include wherein the first firmware patch and the second firmware patch comprise a plurality of binary images, each of the plurality of binary images for a selected one or more IP blocks.

Example 12 is a method including storing a first firmware patch in a primary patch region of a secure patch memory in a processor and a second firmware patch in a secondary patch region in the secure patch memory; executing, by a core of the processor, a first patch commit instruction; and sending, by a security controller of the processor, the second firmware patch to one or more intellectual property (IP) blocks of the processor, setting the secondary patch region to the primary patch region when the first patch commit instruction indicates the second firmware patch is valid, and getting the first firmware patch from the primary patch region and sending the first firmware patch to the one or more IP blocks when the first patch commit instruction indicates the second firmware patch is invalid.

In Example 13, the subject matter of Example 12 can optionally include storing register values modified by the first firmware patch in a primary save state region of the secure patch memory and storing register values modified by the second firmware patch and in a secondary save state region of the secure patch memory.

In Example 14, the subject matter of Example 13 can optionally include getting, by the security controller, the register values from the primary save state region and sending the register values from the primary save state region to the one or more IP blocks when the first patch commit instruction indicates the second firmware patch is invalid.

In Example 15, the subject matter of Example 12 can optionally include executing a second patch commit instruction, the second patch commit instruction indicating an address of the second firmware patch in a system memory, and getting, by the security controller, the second firmware patch from the system memory at the address and storing the second firmware patch in the secondary patch region in the secure patch memory.

In Example 16, the subject matter of Example 12 can optionally include receiving, by the core, the first patch commit instruction and the second patch commit instruction from one of an operating system and a baseboard management controller.

In Example 17, the subject matter of Example 12 can optionally include determining, by one of an operating system and a baseboard management controller, if the second firmware patch is valid or invalid.

In Example 18, the subject matter of Example 12 can optionally include executing, by the core, a first patch commit instruction; and sending, by the security controller, the second firmware patch to the one or more IP blocks, setting the secondary patch region to the primary patch region when the first patch commit instruction indicates the second firmware patch is valid, and getting the first firmware patch from the primary patch region and sending the first firmware patch to the one or more IP blocks when the first patch commit instruction indicates the second firmware patch is invalid, during runtime of a computing system including the core and the security controller.

Example 19 is a system including a system memory to store a first firmware patch and a second firmware patch; and a processor, the processor including: one or more intellectual property (IP) blocks; a secure patch memory to store a first firmware patch in a primary patch region and a second firmware patch in a secondary patch region; a processing core to execute a first patch commit instruction; and a security controller to send the second firmware patch to the one or more IP blocks, set the secondary patch region to the primary patch region when the first patch commit instruction indicates the second firmware patch is valid, and get the first firmware patch from the primary patch region and send the first firmware patch to the one or more IP blocks when the first patch commit instruction indicates the second firmware patch is invalid.

In Example 20, the subject matter of Example 19 can optionally include wherein the secure patch memory comprises a primary save state region to store register values modified by the first firmware patch and a secondary save state region to store register values modified by the second firmware patch and the security controller is to store the register values modified by the second firmware patch into the secondary save state region.

In Example 21, the subject matter of Example 20 can optionally include the security controller to get the register values from the primary save state region and send the register values from the primary save state region to the one or more IP blocks when the first patch commit instruction indicates the second firmware patch is invalid.

In Example 22, the subject matter of Example 19 can optionally include the processing core to execute a second patch commit instruction, the second patch commit instruction indicating an address of the second firmware patch in a system memory, and the security controller to get the second firmware patch from the system memory at the address and store the second firmware patch in the secondary patch region in the secure patch memory.

In Example 23, the subject matter of Example 19 can optionally include wherein the secure patch memory comprises a plurality of primary patch regions and a plurality of secondary patch regions associated with the plurality of primary patch regions, each of the primary patch regions and the secondary patch regions storing firmware patches for a selected one of more of the one or more IP blocks.

In Example 24, the subject matter of Example 19 can optionally include wherein the processing core to execute a first patch commit instruction; and the security controller to send the second firmware patch to the one or more IP blocks, set the secondary patch region to the primary patch region when the first patch commit instruction indicates the second firmware patch is valid, and get the first firmware patch from the primary patch region and send the first firmware patch to the one or more IP blocks when the first patch commit instruction indicates the second firmware patch is invalid, during runtime of a computing system including the processing core and the security controller.

In Example 25, the subject matter of Example 19 can optionally include wherein the secure patch memory and the security controller are on a same die as the processing core.

In Example 26, the subject matter of Example 19 can optionally include wherein the secure patch memory is accessible only by the security controller.

Example 27 is an apparatus operative to perform the method of any one of Examples 12 to 18.

Example 28 is an apparatus that includes means for performing the method of any one of Examples 12 to 18.

Example 29 is an apparatus that includes any combination of modules and/or units and/or logic and/or circuitry and/or means operative to perform the method of any one of Examples 12 to 18.

Example 30 is an optionally non-transitory and/or tangible machine-readable medium, which optionally stores or otherwise provides instructions that if and/or when executed by a computer system or other machine are operative to cause the machine to perform the method of any one of Examples 12 to 18.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
   one or more intellectual property (IP) blocks;
   a secure patch memory to store a first firmware patch in a primary patch region and a second firmware patch in a secondary patch region, wherein the secure patch memory comprises a plurality of primary patch regions and a plurality of secondary patch regions associated with the plurality of primary patch regions, each of the primary patch regions and the secondary patch regions storing firmware patches for a selected one or more of the one or more IP blocks;
   a processing core to execute a first patch commit instruction; and
   a security controller to send the second firmware patch to the one or more IP blocks, set the secondary patch region to the primary patch region when the first patch commit instruction indicates the second firmware patch is valid, and get the first firmware patch from the primary patch region and send the first firmware patch to the one or more IP blocks when the first patch commit instruction indicates the second firmware patch is invalid.

2. The apparatus of claim 1, wherein the secure patch memory comprises a primary save state region to store register values modified by the first firmware patch and a secondary save state region to store register values modified by the second firmware patch and the security controller is to store the register values modified by the second firmware patch into the secondary save state region.

3. The apparatus of claim 2, the security controller to get the register values from the primary save state region and send the register values from the primary save state region to the one or more IP blocks when the first patch commit instruction indicates the second firmware patch is invalid.

4. The apparatus of claim 1, the processing core to execute a second patch commit instruction, the second patch commit instruction indicating an address of the second firmware patch in a system memory, and the security controller to get the second firmware patch from the system memory at the address and store the second firmware patch in the secondary patch region in the secure patch memory.

5. The apparatus of claim 4, the processing core to receive the first patch commit instruction and the second patch commit instruction from one of an operating system and a baseboard management controller.

6. The apparatus of claim 1, wherein one of an operating system and a baseboard management controller determines if the second firmware patch is valid or invalid.

7. The apparatus of claim 1, wherein the processing core to execute a first patch commit instruction; and the security controller to send the second firmware patch to the one or more IP blocks, set the secondary patch region to the primary patch region when the first patch commit instruction indicates the second firmware patch is valid, and get the first firmware patch from the primary patch region and send the first firmware patch to the one or more IP blocks when the first patch commit instruction indicates the second firmware patch is invalid, during runtime of a computing system including the processing core and the security controller.

8. The apparatus of claim 1, wherein the secure patch memory and the security controller are on a same die as the processing core.

9. The apparatus of claim 1, wherein the secure patch memory is accessible only by the security controller.

10. The apparatus of claim 1, wherein the first firmware patch and the second firmware patch comprise a plurality of binary images, each of the plurality of binary images for a selected one or more IP blocks.

11. A method comprising:
storing a first firmware patch in a primary patch region of a secure patch memory in a processor and a second firmware patch in a secondary patch region in the secure patch memory, wherein the secure patch memory comprises a plurality of primary patch regions and a plurality of secondary patch regions associated with the plurality of primary patch regions, each of the primary patch regions and the secondary patch regions storing firmware patches for a selected one or more of one or more intellectual property (IP) blocks of a processor;
executing, by a core of the processor, a first patch commit instruction; and
sending, by a security controller of the processor, the second firmware patch to the one or more IP blocks of the processor, setting the secondary patch region to the primary patch region when the first patch commit instruction indicates the second firmware patch is valid, and getting the first firmware patch from the primary patch region and sending the first firmware patch to the one or more IP blocks when the first patch commit instruction indicates the second firmware patch is invalid.

12. The method of claim 11, comprising storing register values modified by the first firmware patch in a primary save state region of the secure patch memory and storing register values modified by the second firmware patch and in a secondary save state region of the secure patch memory.

13. The method of claim 12, comprising getting, by the security controller, the register values from the primary save state region and sending the register values from the primary save state region to the one or more IP blocks when the first patch commit instruction indicates the second firmware patch is invalid.

14. The method of claim 11, comprising executing a second patch commit instruction, the second patch commit instruction indicating an address of the second firmware patch in a system memory, and getting, by the security controller, the second firmware patch from the system memory at the address and storing the second firmware patch in the secondary patch region in the secure patch memory.

15. The method of claim 14, comprising receiving, by the core, the first patch commit instruction and the second patch commit instruction from one of an operating system and a baseboard management controller.

16. The method of claim 11, comprising determining, by one of an operating system and a baseboard management controller, if the second firmware patch is valid or invalid.

17. The method of claim 11, comprising executing, by the core, a first patch commit instruction; and sending, by the security controller, the second firmware patch to the one or more IP blocks, setting the secondary patch region to the primary patch region when the first patch commit instruction indicates the second firmware patch is valid, and getting the first firmware patch from the primary patch region and sending the first firmware patch to the one or more IP blocks when the first patch commit instruction indicates the second firmware patch is invalid, during runtime of a computing system including the core and the security controller.

18. A system, comprising:
a system memory to store a first firmware patch and a second firmware patch; and
a processor, the processor including:
one or more intellectual property (IP) blocks;
a secure patch memory to store a first firmware patch in a primary patch region and a second firmware patch in a secondary patch region, wherein the secure patch memory comprises a plurality of primary patch regions and a plurality of secondary patch regions associated with the plurality of primary patch regions, each of the primary patch regions and the secondary patch regions storing firmware patches for a selected one or more of the one or more IP blocks;
a processing core to execute a first patch commit instruction; and
a security controller to send the second firmware patch to the one or more IP blocks, set the secondary patch region to the primary patch region when the first patch commit instruction indicates the second firmware patch is valid, and get the first firmware patch from the primary patch region and send the first firmware patch to the one or more IP blocks when the first patch commit instruction indicates the second firmware patch is invalid.

19. The system of claim 18, wherein the secure patch memory comprises a primary save state region to store register values modified by the first firmware patch and a secondary save state region to store register values modified by the second firmware patch and the security controller is to store the register values modified by the second firmware patch into the secondary save state region.

20. The system of claim 19, the security controller to get the register values from the primary save state region and send the register values from the primary save state region to the one or more IP blocks when the first patch commit instruction indicates the second firmware patch is invalid.

21. The system of claim 18, the processing core to execute a second patch commit instruction, the second patch commit instruction indicating an address of the second firmware patch in a system memory, and the security controller to get the second firmware patch from the system memory at the address and store the second firmware patch in the secondary patch region in the secure patch memory.

22. The system of claim 18, wherein the processing core to execute a first patch commit instruction; and the security controller to send the second firmware patch to the one or more IP blocks, set the secondary patch region to the primary patch region when the first patch commit instruction indicates the second firmware patch is valid, and get the first firmware patch from the primary patch region and send the first firmware patch to the one or more IP blocks when the first patch commit instruction indicates the second firmware patch is invalid, during runtime of a computing system including the processing core and the security controller.

23. The system of claim 18, wherein the secure patch memory and the security controller are on a same die as the processing core.

24. The system of claim 18, wherein the secure patch memory is accessible only by the security controller.

* * * * *